United States Patent [19]

Gu

[11] Patent Number: 5,245,419
[45] Date of Patent: Sep. 14, 1993

[54] COLOR IMAGE FORMING APPARATUS AND METHOD AND APPARATUS FOR PROCESSING COLOR IMAGE

[75] Inventor: Sono Gu, Ohmiya, Japan

[73] Assignee: Canon Kabushiki Kaisha, Tokyo, Japan

[21] Appl. No.: 793,213

[22] Filed: Nov. 6, 1991

Related U.S. Application Data

[63] Continuation of Ser. No. 301,474, Jan. 26, 1989.

Foreign Application Priority Data

| Jan. 29, 1988 | [JP] | Japan | 63-18815 |
| Jan. 29, 1988 | [JP] | Japan | 63-18817 |
| Jul. 27, 1988 | [JP] | Japan | 63-185477 |
| Sep. 12, 1988 | [JP] | Japan | 63-226594 |

[51] Int. Cl.$^5$ .................. G03F 3/08; H04N 1/40
[52] U.S. Cl. .................. 358/521; 358/500; 358/448
[58] Field of Search .......... 358/75, 80, 443, 445, 358/447, 448, 455, 456, 458, 462

[56] References Cited

U.S. PATENT DOCUMENTS

| 4,032,969 | 6/1977 | Ueda | 358/80 |
| 4,636,844 | 1/1987 | Sasaki | 358/80 |
| 4,680,642 | 7/1987 | Shimano et al. | 358/75 |
| 4,745,466 | 5/1988 | Yoshida et al. | 358/80 |
| 4,763,199 | 8/1988 | Suzuki | 358/445 |

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

There are provided an image forming apparatus and method and apparatus for processing an image for the image forming apparatus, comprising: gradation reproducing means having different gradation reproducing characteristics; a color processing circuit for color processing in accordance with the gradation reproducing characteristic; and a process selecting circuit for selecting signal processes in the color processing circuit and the gradation reproducing means in accordance with an image region. Further, the color processing circuit has a masking coefficient train or UCR coefficients which are determined in accordance with the gradation reproducing characteristic. The process selecting circuit selects the signal processes in the color processing circuit and the gradation reproducing means in accordance with the image region.

31 Claims, 19 Drawing Sheets

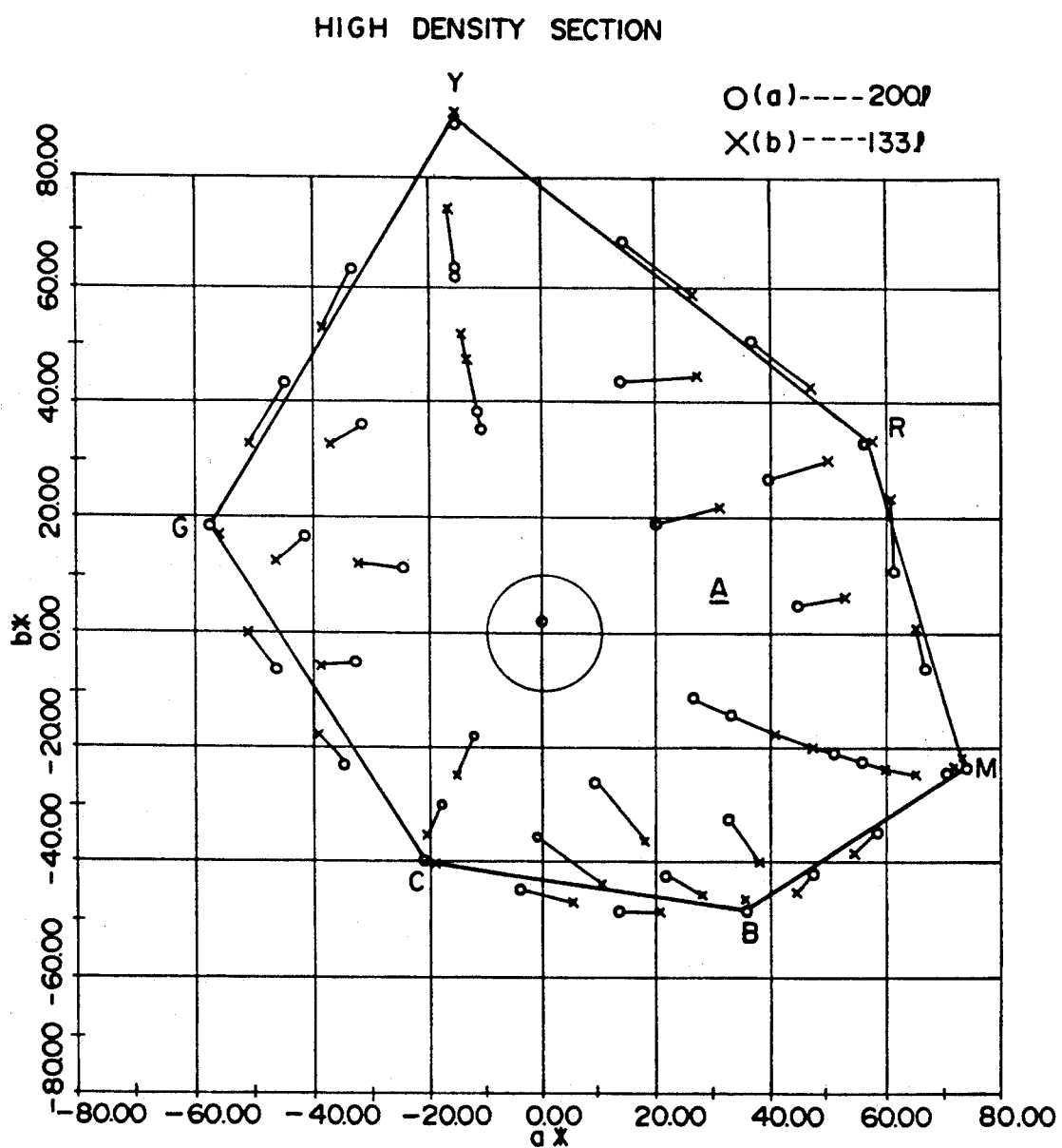

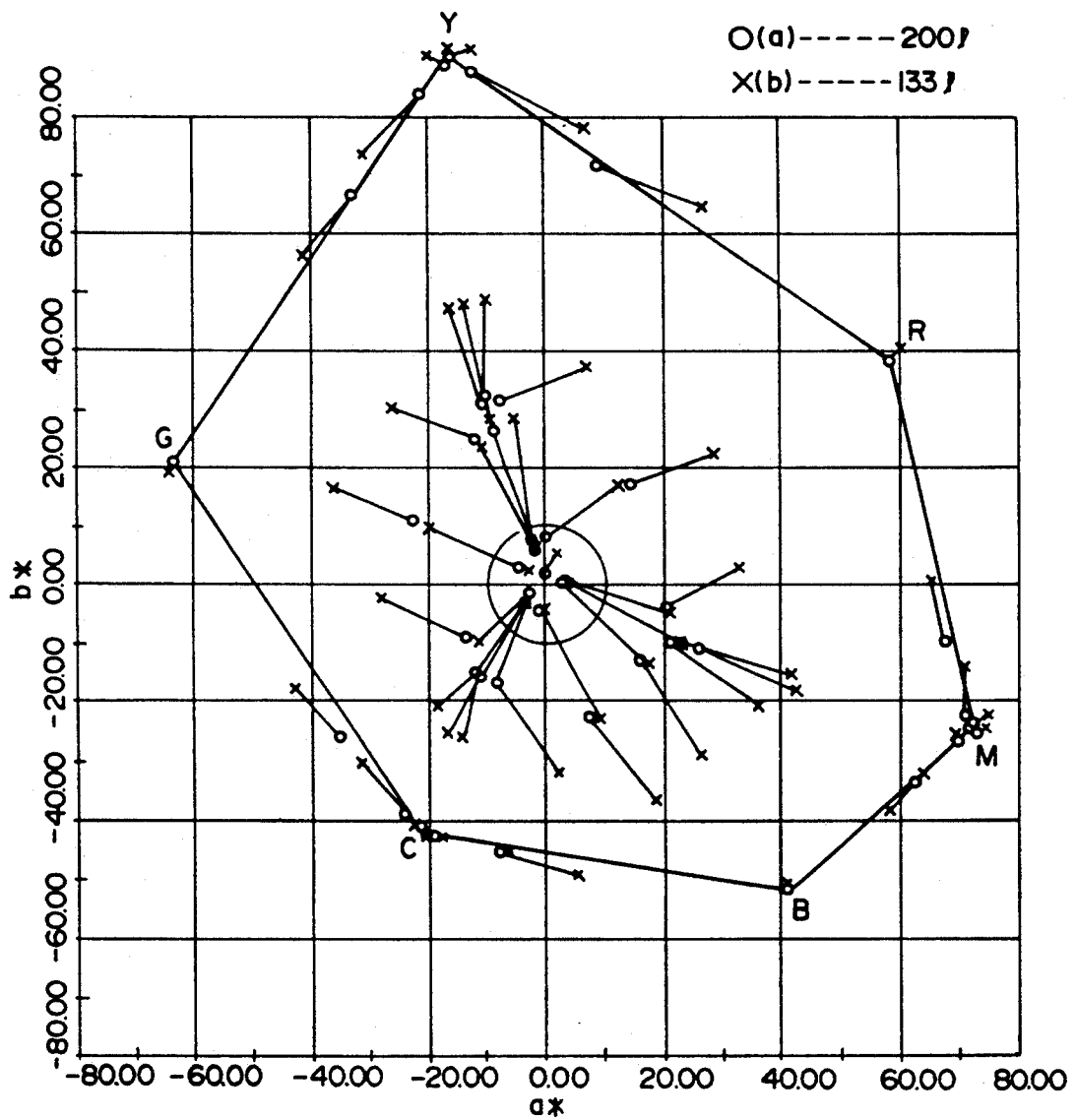

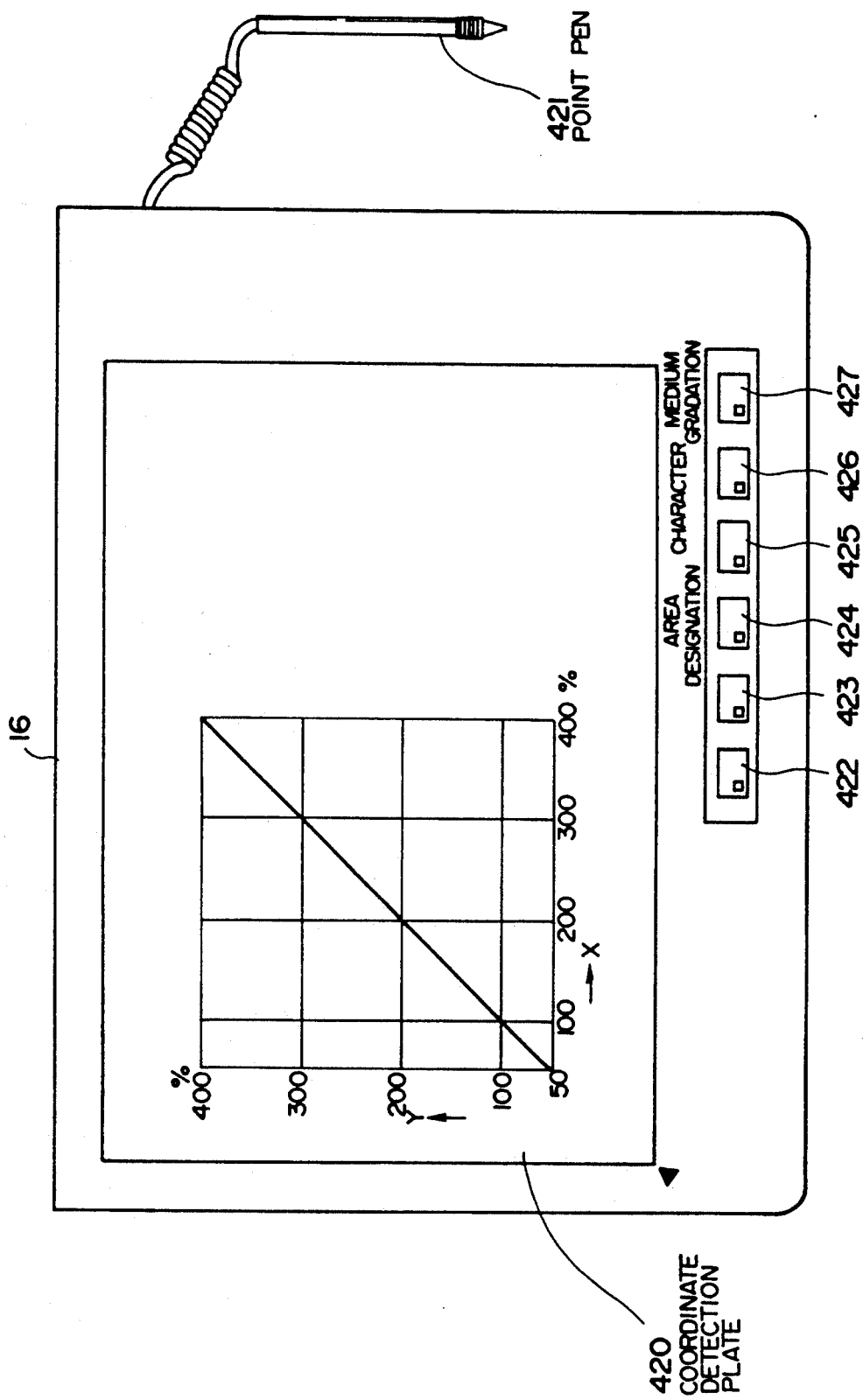

COLOR IMAGE FORMING APPARATUS AND METHOD AND APPARATUS FOR PROCESSING COLOR IMAGE

This application is a continuation of application Ser. No. 07/301,474, filed Jan. 26, 1989.

BACKGROUND OF THE INVENTION

1. Field of the Invention

The present invention relates to a color image forming apparatus having a color correcting function and to a method and apparatus for processing a color image.

2. Related Background Art

Various kinds of color image forming apparatuses have been known. Among them, an apparatus using a laser printer in which an image is exposed to a photosensitive material by a laser beam and developed to thereby obtain an image is frequently used. Such a laser printer has the advantages that the printing quality is high, the printing speed is high, and the like and, therefore, it is widely used as an output apparatus of, for instance, a color copying machine or the like or as an ordinary printer. In such a laser printer, the modulation for making the light emitting time of the laser correspond to the magnitude of image signal, namely, what is called a pulse width modulation, is executed and an image is formed.

When the pulse width modulation is executed as mentioned above, a plurality of gradation reproducing characteristics as shown by a and b in FIG. 3 can be selected by changing the period of reference pulse. In the reproducing characteristic a shown in the diagram, although the whole image can be sharply reproduced, the high-light portions become dull. In the reproducing characteristic of b, although the gradation of the high-light portions is good, it is difficult to obtain a sharp image as a whole.

In the apparatus for processing a color image by switching the gradation reproducing characteristics as mentioned above, there are the following problems. For instance, when color correcting coefficients are determined on the basis of the reproducing characteristic b as a reference, the high-light portions become dull for the reproducing characteristic a. Therefore, the color reproduction in such portions is not all that could be desired. On the contrary, for example, when color correcting coefficients are decided on the basis of the reproducing characteristic a as a reference, the color reproduction in the high-light portions is deviated.

Such problems are not limited to the apparatus for forming an image by performing pulse width modulation as mentioned above but similarly occur in an apparatus which can change the color image forming conditions when forming a color image or an apparatus in which the gradation reproducing characteristic changes.

SUMMARY OF THE INVENTION

In consideration of the problems in the foregoing conventional techniques, it is an object of the present invention to provide a method and apparatus for processing a color image and an image forming apparatus for enabling the colors and sufficient gradations to be preferably reproduced.

Another object of the invention is to provide a method or apparatus for processing a color image or an image forming apparatus for enabling a color image to be preferably formed irrespective of the image forming conditions.

Under such objects, according to a preferred embodiment of the invention, there is disclosed an image forming apparatus comprising: processing means for performing a color correction or an undercolor process of a color image signal supplied; color image forming means for forming a color image in accordance with the color image signal corrected by the processing means, in which the color image forming means can change a color image forming condition; and control means for controlling operation of the processing means in accordance with the image forming condition.

Still another object of the invention is to provide a method and apparatus for processing a color image and an image forming apparatus in which even if a region of an image having different characteristics exists in one image, a color image can be preferably reproduced in accordance with the characteristics of this region.

Further, another object of the invention is to provide a method and apparatus for processing a color image and an image forming apparatus which is adapted to an image forming apparatus of the electrophotographic system.

The above and other objects and features of the present invention will become apparent from the following detailed description taken with reference to the accompanying drawings.

BRIEF DESCRIPTION OF THE DRAWINGS

FIG. 1-2 is a flowchart showing the operation of CPU 20 shown in FIG. 1-1;

FIG. 2 is a block diagram showing circuits in a printer 17;

FIGS. 6-1 and 6-2 are diagrams each showing a part of the chromaticity coordinates of a reference color original;

FIGS. 7-1 to 7-4 are diagrams each showing the chromaticity of a reference color original and the chromaticity coordinates after an image has been reproduced;

FIG. 15 is a plan view of a digitizer as an example of means for generating a region signal.

DETAILED DESCRIPTION OF THE PREFERRED EMBODIMENTS

The present invention will be described in detail hereinbelow on the basis of an embodiment.

Figure 4:
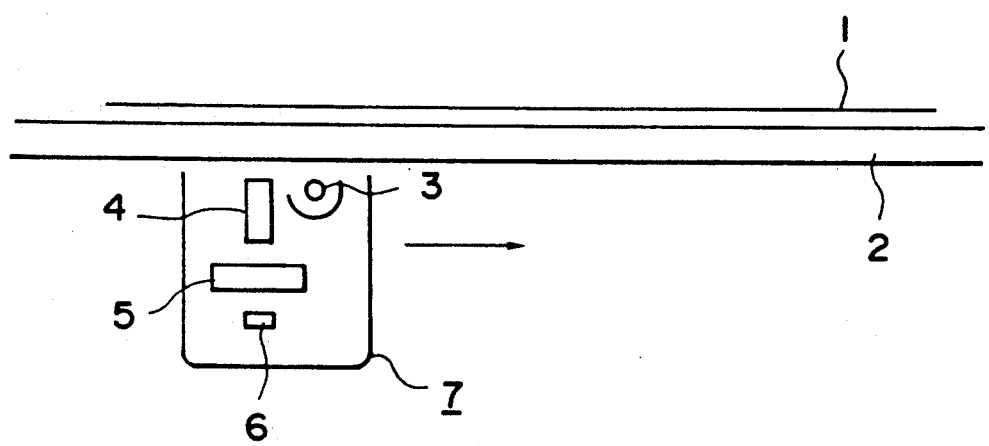
FIG. 4 is a cross-sectional view of an image reading apparatus including a CCD 6.

FIG. 4 is a schematic arrangement diagram of a color image reading apparatus which is used in this embodiment. In the diagram, reference numeral 1 denotes an original; 2 indicates an original glass plate onto which the original 1 is put; 3 is an original illuminating apparatus such as a lamp; 4 an image forming device array; 5 an infrared ray cutting filter; 6 a contact-type CCD color sensor (hereinafter, simply referred to as a CCD); and 7 an optical system unit for integrally holding the components of the lamp 3 to the CCD 6.

Figure 5:
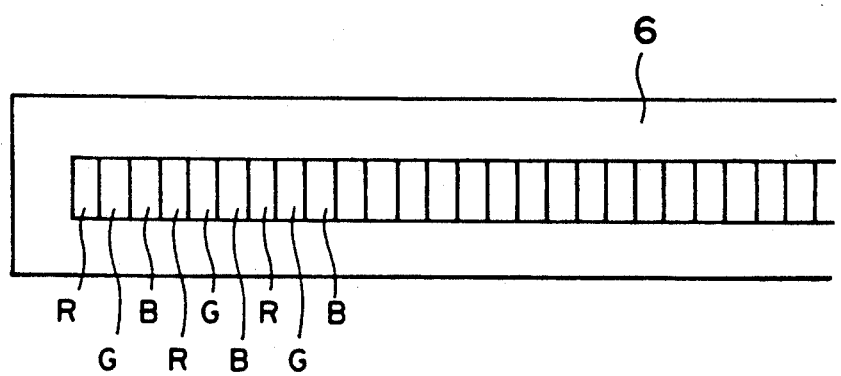
FIG. 5 is an enlarged diagram of the surface of the CCD 6.

First, a reading process for reading a color original will be described. When a copy key (not shown) is depressed, the illuminating apparatus 3 illuminates the original 1. The reflected light from the original is transmitted through the image forming device array 4 and infrared ray cutting filter 5. An original image is formed on the CCD 6. The original is scanned in the direction of the arrow (denoting scanning of the optical system unit 7 relative to the original 1). FIG. 5 is an enlarged front view of a part of this CCD 6 in the embodiment. As shown in FIG. 5, filters of red (R), green (G), and blue (B) are regularly attached to the CCD 6 for every pixel. Together with the sub-scan in the direction in FIG. 4 arrow of the an electric signal from the CCD 6 is processed by a signal processing circuit shown in FIG. 1-1.

Figure 1:
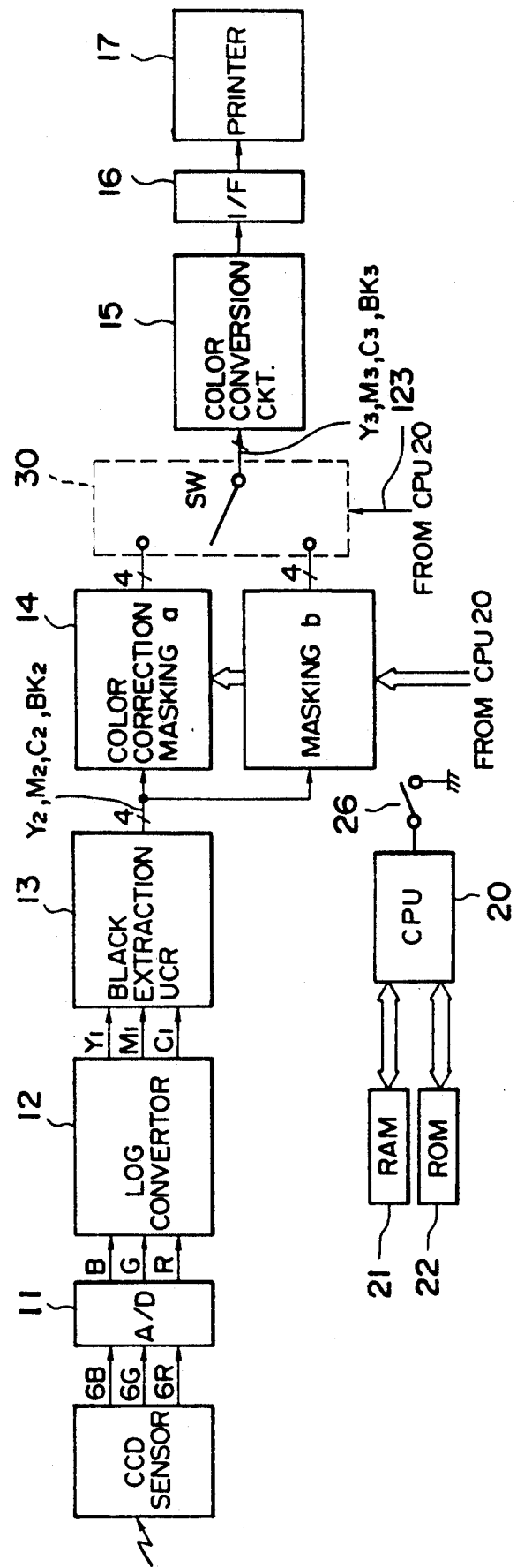
FIG. 1-1 is a block diagram of an embodiment of the present invention.

In FIG. 1-1, reference numerals 6B, 6G, and 6R denote signals from elements of B, G, and R on the CCD 6 shown in FIG. 5. The R, G, and B signals 6R, 6G, and 6B are supplied to an A/D conversion circuit 11 and LOG conversion circuits 12 and converted into (density data) $Y_1$, $M_1$, and $C_1$ signals of the digital signal format.

The $Y_1$, $M_1$, and $C_1$ signals are input to a black extraction and UCR (undercolor removal) circuit 13 to extract the black component and to remove the undercolor component, so that $Y_2$, $M_2$, $C_2$, and $Bk_2$ signals are produced by arithmetic operating processes as shown in the following equations;

$$Y_2 = Y_1 - k_3(Y_1, M_1, C_1)_{min}$$

$$M_2 = M_1 - k_3(Y_1, M_1, C_1)_{min}$$

$$C_2 = C_1 - k_3(Y_1, M_1, C_1)_{min}$$

$$Bk_2 = k_1(Y_1, M_1, C_1)_{min} + k_2$$

$(Y_1, M_1, C_1)_{min}$ represents the minimum signal among the $Y_1$, $M_1$, and $C_1$ signals; $k_1$, $k_2$, and $k_3$ denote constants.

The $Y_2$, $M_2$, and $C_2$ signals are supplied to a color correction circuit 14. The correction circuit 14 executes the arithmetic operating process as shown by the following equation;

$$\begin{bmatrix} Y_3 \\ M_3 \\ C_3 \end{bmatrix} = \begin{bmatrix} a_{11} a_{12} a_{13} \\ a_{21} a_{22} a_{33} \\ a_{31} a_{32} a_{33} \end{bmatrix} \begin{bmatrix} Y_2 \\ M_2 \\ C_2 \end{bmatrix}$$

$a_{11}$ to $a_{33}$ indicate color correction masking coefficients.

The above processes are controlled by a CPU (central processing unit) 20. Arithmetic operating programs and data are stored in a RAM (random access memory) 21 and a ROM (read only memory) 22.

In this embodiment, as the color correction circuit for masking, there are provided two correction circuits for a character mode to form a diagram and for a photo mode to form a medium gradation image. The two color correction circuits 14 are selected between by a switching circuit 30. An output of the color correction circuits 14 selected by the switching circuit 30 is sent to a color conversion circuit 15 and is transmitted to a printer 17 through an interface (I/F) circuit 16.

The $Y_3$, $M_3$, $C_3$, and $Bk_3$ signals are developed by color image forming means (printer 17) such as a color thermal transfer printer, color ink jet printer, color laser beam printer, or the like.

Figures 1, 2:
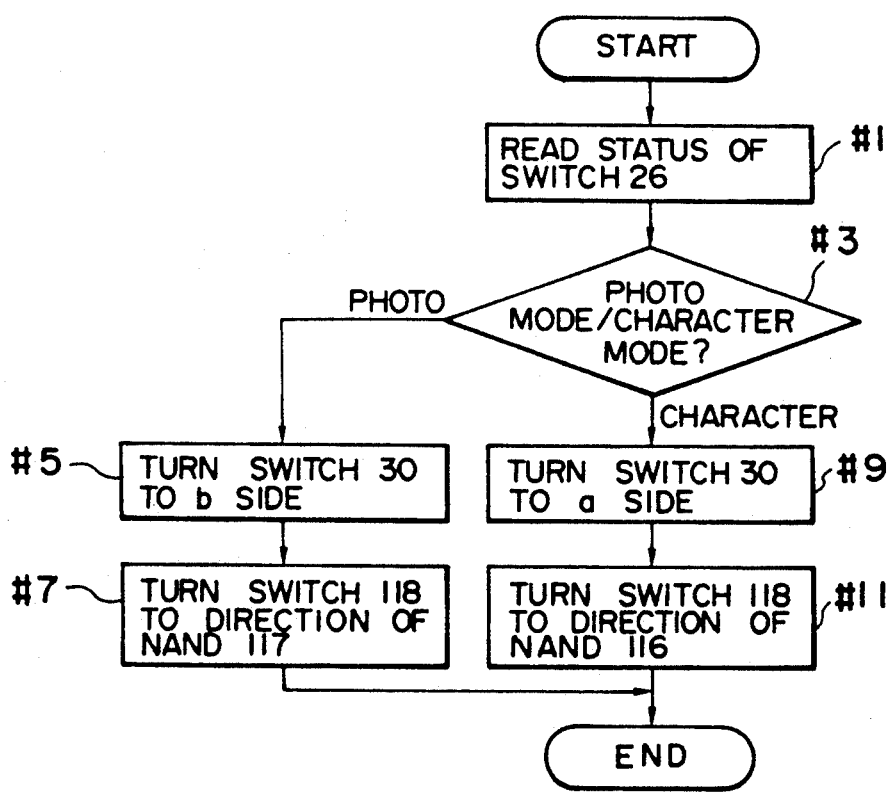
Figure 2:
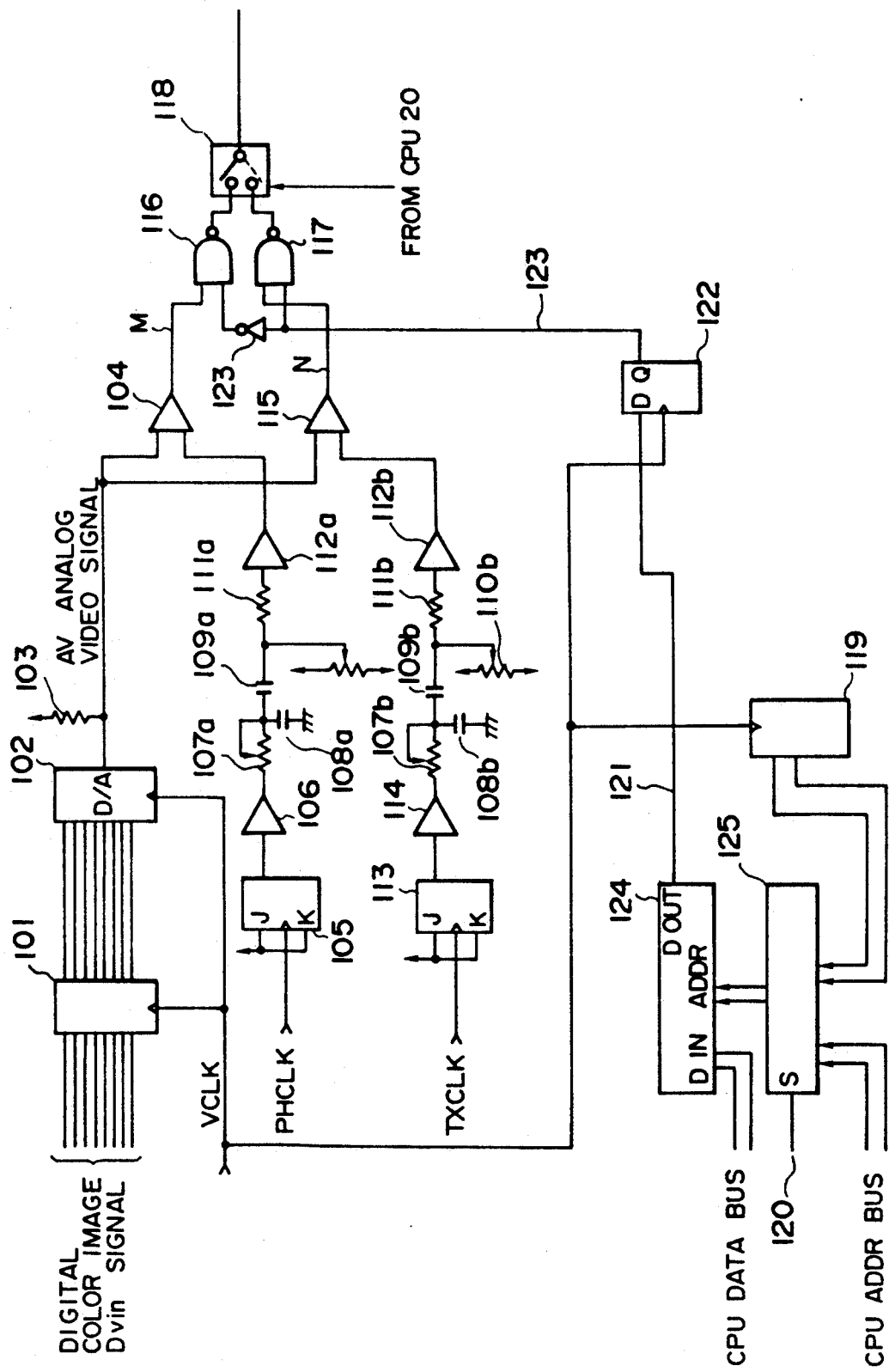

FIG. 2 shows an example of a circuit which is used when an image is formed by performing pulse width modulation. A digital color image signal $D_{vin}$ from the interface circuit 16 is latched by a latch 101 synchronously with a video clock VCLK and synchronization is obtained. The image signal $D_{vin}$ is converted into an analog video signal AV by a D/A converter 102. An output of the D/A converter 102 is converted into a voltage level by a resistor 103 and, thereafter, it is input to one input terminal of each of two comparators 104 and 115. In this embodiment, there are provided two triangular wave generation circuits each of which is fundamentally constituted by an integrating circuit. The triangular wave generating circuits integrate outputs of J/K flip-flops 105 and 113 for frequency dividing clock signals PHCLK and TXCLK, which are synchronized with the VCLK and have different periods into halves. The frequency of the TXCLK is set to a frequency of a at which the resolution is an important factor. On the other hand, the frequency of the PHCLK is set to a frequency of b (a>b). These frequency divided clock signals, each having a duty ratio of 50%, are transmitted through buffers 106 and 114 and become triangular waves by integrating circuits consisting of variable resistors 107a and 107b and capacitors 108a and 108b. The triangular waves are then adjusted by capacitors 109a and 109b and variable resistors 110a and 110b by the bias amounts and then input to the other input terminals of the comparators 104 and 115 through protective resistors 111a and 111b and buffer amplifiers 112a and 112b. These signals are compared with the analog video signal AV and two pulse width modulation signals M and N are derived. The signals M and N are input to a switch 118. The M signal is selected by the switch 118 in the case of a character original and the N signal is selected by the switch 118 in the case of a photographic original on the basis of a control signal 123 from the CPU 20.

Such a switching operation is performed by the operation of the CPU 20. The operation of the CPU 20 in this case will now be described with reference to the flowchart of FIG. 1-2.

First, the status of a mode setting switch 26 is read (step #1) and a check is made to see if the photo mode or the character mode has been set (step #3). The photo mode is a mode corresponding to the reproducing characteristic of the medium gradation shown by b in FIG. 3, which will be explained hereinbelow. The character mode is a mode corresponding to the reproducing characteristic shown by a in FIG. 3, which will be explained hereinbelow. If the photo mode has been set in step #3, the switching circuit 30 is connected to the b side (step #5) and the switch 118 is switched to the side of a NAND gate 117 (step #7). If the character mode has been set in step #3, the switching circuit 30 is connected to the a side (step #9) and the switch 118 is switched to the side of a NAND gate 116 (step #11). Thus, the color correction based on the switching of the masking coefficients in accordance with the gradation reproducing characteristics of the printer 17 can be performed.

The characteristic condition that the image outputs when the same color original is read are equal is required for the color image reading means.

An example of the masking coefficients as the color correcting means for this purpose will now be described hereinbelow.

First, a reference color original whose chromaticity coordinates are known is read by the optical system unit 7 shown in FIG. 4. For instance, in this embodiment, the masking coefficients are decided in accordance with the following procedure of the method of least square so that the $Y_3$, $M_3$, $C_3$, and $Bk_3$ signals of the color correction circuits 14 shown in FIG. 1 are set to the objective values. $Y'$, $M'$, and $C'$ correspond to $Y_1$, $M_1$, and $C_1$ in FIG. 1. $Y_i$ denotes objective values, respectively. i represents the number of each point on a color image which is used when the masking coefficients are determined. In this embodiment, sixty-four points are selected as will be explained hereinlater.

The evaluating functions of yellow, magenta, and cyan are $\phi_Y$, $\phi_M$, and $\phi_C$, respectively. With respect to yellow, the following equations are obtained;

$$\phi_Y = \sum_i (a_{11}Y_i + a_{12}M_i + a_{13}C_i - Y_i)^2$$

$$\frac{\partial \phi_Y}{\partial a_{11}} = 2\left\{\left(\sum_i Y_iY_i\right)a_{11} + \left(\sum_i M_iY_i\right)a_{12} + \left(\sum_i C_iY_i\right)a_{13} - \left(\sum_i Y_iY_i\right)\right\} = 0$$

$$\frac{\partial \phi_Y}{\partial a_{12}} = 2\left\{\left(\sum_i Y_iM_i\right)a_{11} + \left(\sum_i M_iM_i\right)a_{12} + \left(\sum_i C_iM_i\right)a_{13} - \left(\sum_i Y_iM_i\right)\right\} = 0$$

$$\frac{\partial \phi_Y}{\partial a_{13}} = 2\left\{\left(\sum_i Y_iY_i\right)a_{11} + \left(\sum_i M_iC_i\right)a_{12} + \left(\sum_i C_iM_i\right)a_{13} - \left(\sum_i Y_iC_i\right)\right\} = 0$$

By similarly executing the arithmetic operations with regard to magenta and cyan, the following equation is obtained;

$$\begin{bmatrix} \sum_i Y_iY_i & \sum_i M_iY_i & \sum_i C_iY_i \\ \sum_i Y_iM_i & \sum_i M_iM_i & \sum_i C_iM_i \\ \sum_i Y_iC_i & \sum_i M_iC_i & \sum_i C_iC_i \end{bmatrix} \begin{bmatrix} a_{11} & a_{21} & a_{31} \\ a_{12} & a_{22} & a_{32} \\ a_{15} & a_{23} & a_{33} \end{bmatrix} =$$

-continued $$\begin{bmatrix} \sum_i Y_iY_i & \sum_i M_iY_i & \sum_i C_iY_i \\ \sum_i Y_iM_i & \sum_i M_iM_i & \sum_i C_iM_i \\ \sum_i Y_iC_i & \sum_i M_iC_i & \sum_i C_iC_i \end{bmatrix}$$

When expressing the above equation by [C][A]=[D], $A=C^{-1}\cdot D$, so that the coefficients $a_{11}$ to $a_{33}$ are obtained. $C^{-1}$ indicates an inverse matrix of C.

The arithmetic operations to obtain the coefficients $a_{11}$ to $a_{33}$ are executed by the CPU 20. The new coefficients $a_{11}$ to $a_{33}$ and $a_{44}$ obtained are then input to the color correction circuits 14.

In this manner, the Y, M, C, and Bk outputs when a reference color image is read can be controlled so as to be always set to values near the objective values.

The reference color original which is used when obtaining the masking coefficients $a_{11}$ to $a_{33}$ will now be described hereinbelow.

The full color image forming means ordinarily reproduces a color image by using three primary color toners of yellow, magenta, and cyan.

The image signal from the color image reading means is transmitted to the color image forming means at predetermined gradation levels (for instance, 256 gradations). In the color image forming means which is used at this time, three primary colors can reproduce 256 gradations, respectively. The number of colors which are obtained by a single color and the mixed colors of a plurality of colors is set to 256×256×256 kinds. Ideally, the reproducing characteristics are obtained with respect to each of those colors and the masking coefficients are decided. However, the arithmetic operations in this case become extremely complicated. Therefore, as a color of a reference color original, among those colors, it is desirable to use the reference color original due to a reference character generator which is selected in a manner such that the range of reproduction of the high-light portion which is important when forming a color image, the range of each single color density reproduction, and the range of the color reproduction become maximum.

As an example of a reference color original, in this embodiment, four levels are prepared by attaching importance to the reproduction on the high-light side such as in the case of the levels of 0, 32, 128, and 256 (wherein 0 denotes white and 256 indicates complete Yellow) among the gradation levels of yellow. In a manner similar to yellow, such four levels are also prepared for magenta and cyan. By combining every four levels of three colors of yellow, magenta, and cyan, patterns having 64 (=4×4×4) colors are obtained. The masking coefficients are determined by using the reference color original having such patterns.

FIGS. 6-1 and 6-2 show color reproducing characteristics in the case where the reference signals a and b of the pulse width modulating means are compared with a digital color image signal, pulse width modulation is executed, and an image is formed.

FIGS. 6-1 and 6-2 are diagrams which are expressed by the a*b* coordinates in the (L*, a*, b*) expression which is used to express the color reproduction and these diagrams show the a*-b* phase looked down on along the L* axis. In the diagrams, there is the tendency that the image density and chroma increase with distance away from the origin. A region (A) surrounded by straight lines denotes a color reproduction range of the color image forming means, the marks ○ indicate chromaticity coordinates of medium gradation which is output on the basis of the reference signal a, and the marks x represent chromaticity coordinates of medium gradation which is output on the basis of the reference signal b.

As will be understood from FIGS. 6-1 and 6-2, the chroma of the medium gradation image in the case of outputting the image by using the reference signal a is lower than that in the case of using the reference signal b. In proportion as the distance from the origin is short in the diagram, the chroma (saturation) is low. That is, in the case of using the reference signal b, the chroma reproduction of the medium gradation is better than that in the case of using the signal a and vivid color reproduction can be realized. On the other hand, in the case of using the signal a, as will be understood from FIGS. 3, 6-1, and 6-2, for the color reproduction range, more importance is attached to the high density side than in the case of using the signal b. As mentioned before, the latter case is suitable for the reproduction of characters or the like.

Therefore, as an evaluation color which is used to determine the masking coefficients of the color correcting means, it is desirable to select the evaluation color such as to attach appropriate importance to the high-light portions with respect to the signal b and to select the evaluation color such as to provide a density higher than that in the case of the signal b with respect to the signal a.

The reference color original (B) which is output by the signal b is read. An image signal is made by using the masking coefficients (b) obtained with respect to the image which has been output by using the reference signal b. The chromaticity of the color reproduced by the color image forming means by the reference signal b is shown by the marks Δ in FIG. 7-1. On the other hand, the reference color original (A) which is output by the reference signal a is read by using the masking coefficients (b). The chromaticity of the color reproduced by the reference signal a is indicated by the marks □ in FIG. 7-2.

Figures 1, 7:
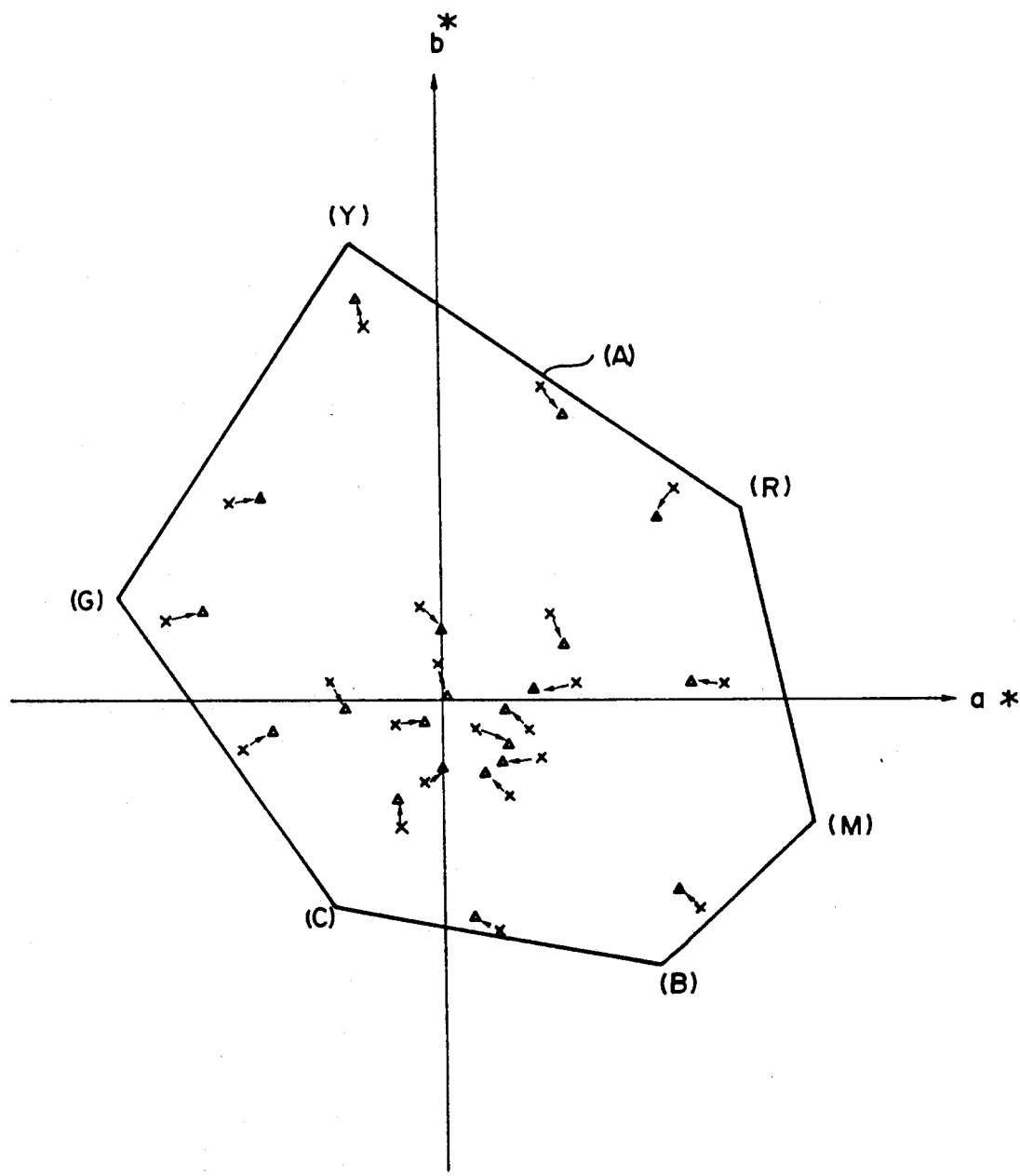
Figures 2, 7:
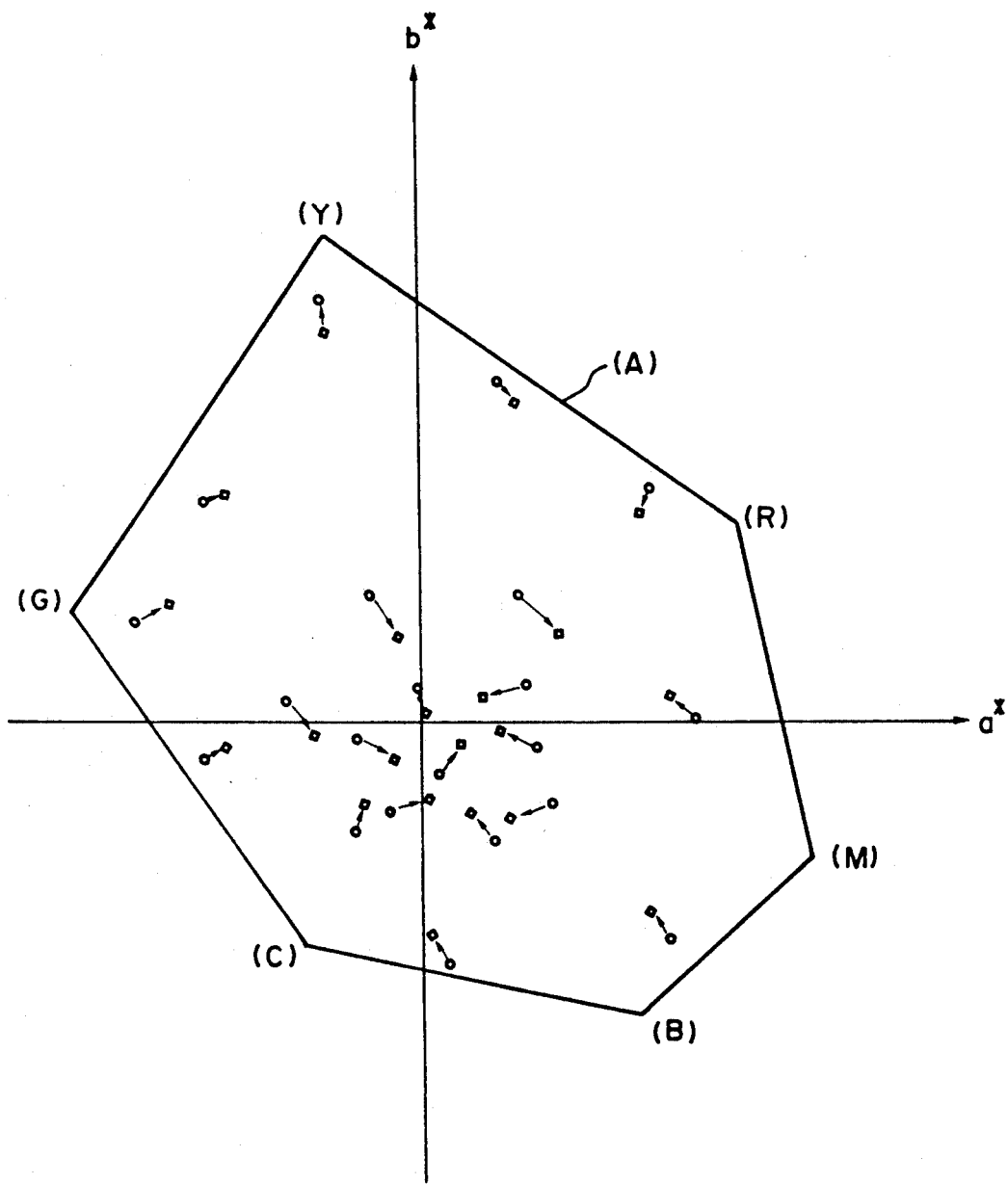
Figures 3, 7:
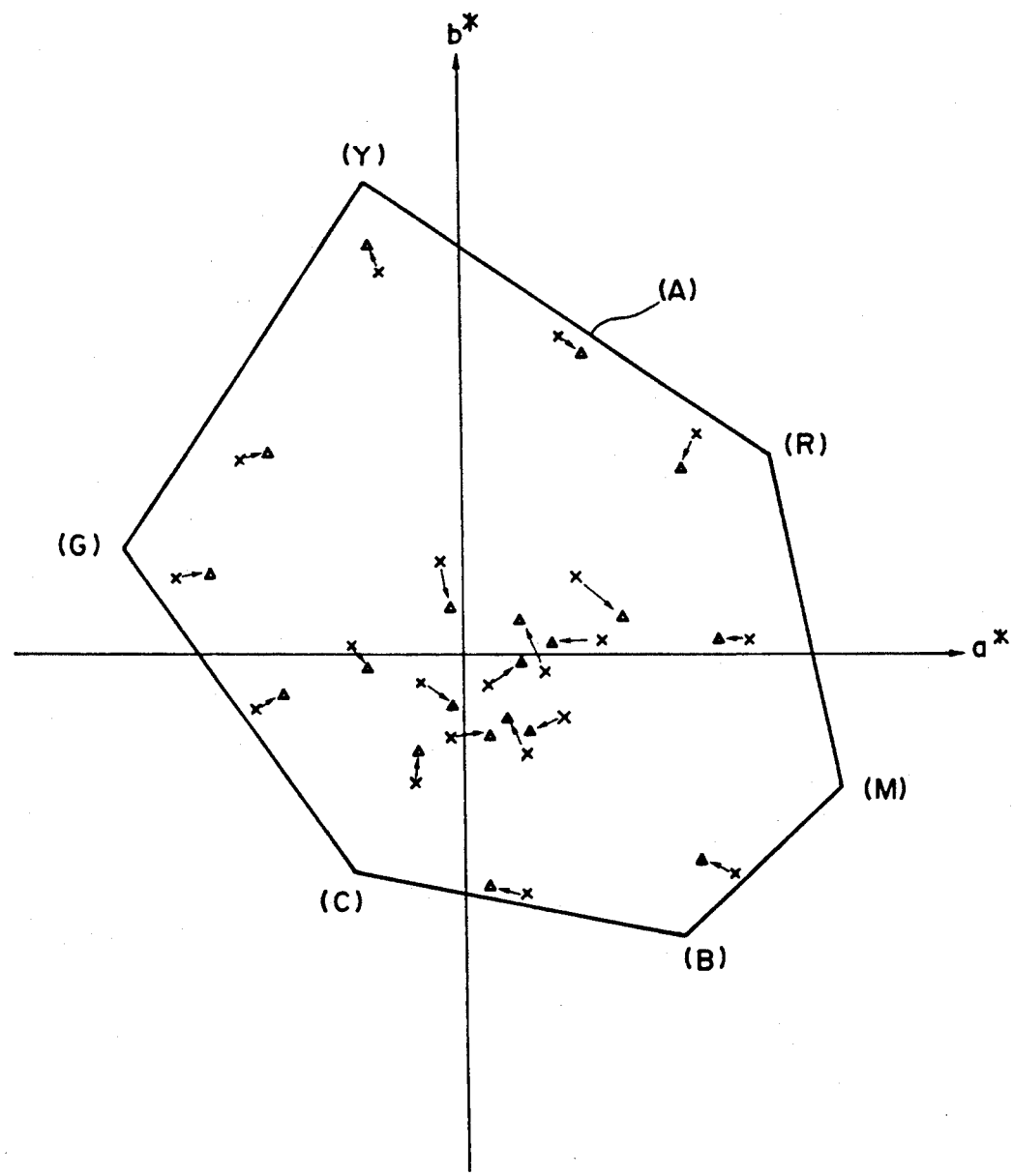
Figures 4, 7:
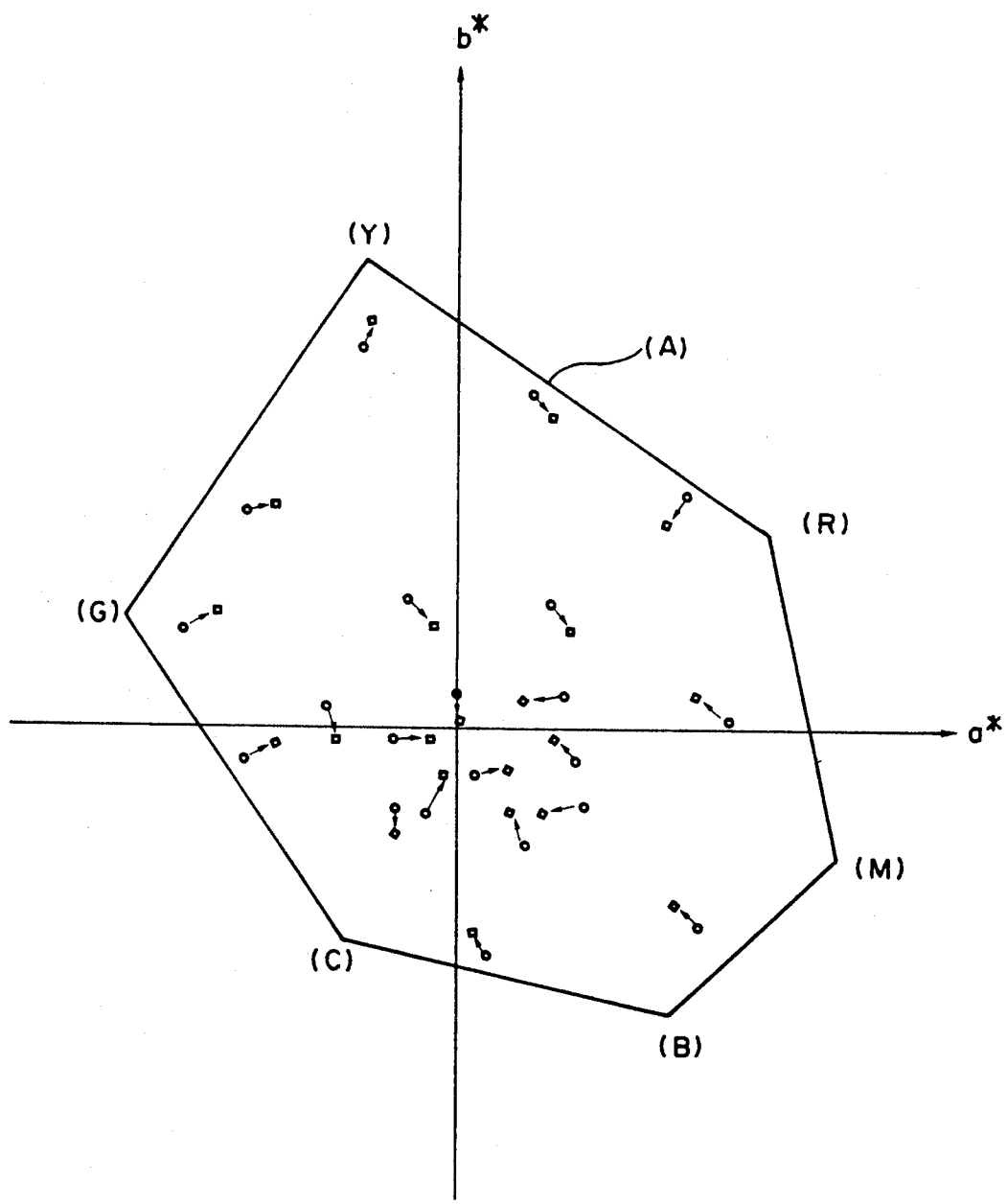

The marks x in FIG. 7-1 and the marks ○ in FIG. 7-2 coincide with the marks x and ○ in FIGS. 6-1 and 6-2, respectively.

As will be understood from FIGS. 7-1 and 7-2, when the image forming means uses the reference signal b, it is possible to substantially equally reproduce over the whole range of a given color. However, when the reference signal a is used, the color reproduction of the high-light portions is poor.

Figure 3:
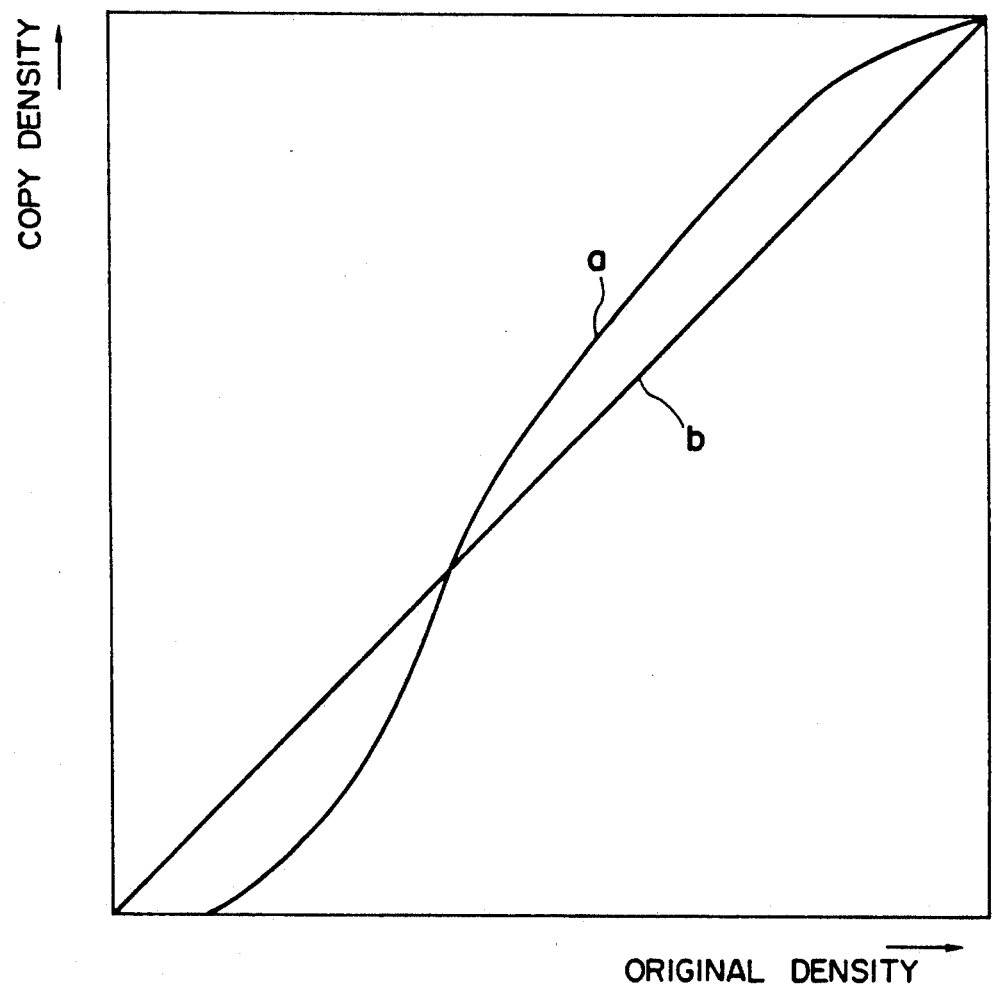
FIG. 3 is a diagram showing the difference of the gradation reproducing characteristics.

Similarly, FIG. 7-3 shows the case where the reference color original (B) is reproduced by the reference signal b by using the masking coefficients (a) for the reference signal a. FIG. 7-4 shows the case where the reference color original (A) is reproduced by the reference signal a by using the masking coefficients (a). As will be understood from FIGS. 7-3 and 7-4, when the reference signal b is used for the masking coefficients (a), the reproduction of the high-light portions is not good. This corresponds to the color of the high-light portions which are hard to reproduce by a in FIG. 3. On the other hand, when the reference signal a is used, the good color reproduction can be obtained As described above, in the case of an original mainly consisting of characters, an image is formed by using both the reference signal a and the color image signal converted by the masking coefficients (a). In the case of an original mainly consisting of a photograph, an image is formed by using both the reference signal b and the color image signal converted by the masking coefficients (b). Thus, a good picture quality can always be obtained.

For the selection of the combinations of the masking coefficients and reference signal mentioned above, for instance, it is sufficient to switch the character mode and photo mode by the operating section. Or, an original is automatically recognized by the color image reading means and the reference signal is switched. In association with the switching of the reference signal, the masking coefficients can be also switched.

In the foregoing embodiment, the color correction circuits 14 have been used as means for performing the color correction of the color image signal supplied. The color correction has electrically been performed by using the predetermined masking coefficients. However, the invention is not limited to such circuits, but the color correction can be also performed by other means. For instance, it is possible to use means for performing the color correction by using the optical color correction mask. Or, when a color image is read, by adjusting the color of light which is illuminated to the color image, the color correction is executed.

The foregoing embodiment has been described with respect to the color image forming apparatus using pulse width modulation. However, it is obvious that problems similar to the conventional problems which have been described above with respect to the gradation reproduction, color reproduction, and the like also occur in the case of switching the number of lines even in a color image forming apparatus of the type as another embodiment in which a light emitting amount of the laser is changed and the gradations are reproduced by the dot area modulation or in the case of changing a dither pattern even in a color image forming apparatus by a conventionally well-known dither pattern method as still another embodiment in which pixels of characteristics are formed by a predetermined laser spot and the lighting on/off operation of each pixel is selected. According to the invention, picture quality can be reproduced at a high fidelity by respectively preparing the masking coefficients in correspondence to the pixel forming conditions.

As described above, according to this embodiment, by preparing the masking coefficients corresponding to the reference signals by only the number of reference signals of the laser drive signals, a picture quality which is suitable to the original image can be always reproduced.

On the other hand, the color laser beam printer using pulse width modulation as mentioned above has been used as color image forming means which can change the color image forming conditions and as means which has a predetermined gradation reproducing characteristic and processes a color image in accordance with the signal which was color corrected by the color image forming means. However, as mentioned above, the invention is not limited to such a printer. An ink jet printer or a color thermal transfer printer may be also used. In short, it is sufficient that the color image forming condition or gradation reproducing characteristic can be changed such that the matrix of the dither patterns can be changed or the like.

On the other hand, in this embodiment, CPU 20 to execute the processes in the flowchart shown in FIG.

1-2 has been used as the means for controlling the correcting state of the color correcting means in accordance with the image forming condition of the color image forming means or with the gradation reproducing characteristic of the color image processing means.

The second embodiment of the invention will now be described with reference to FIG. 8.

The second embodiment discloses an apparatus in which an image can be preferably formed by changing the undercolor process in accordance with a change in image forming condition The construction to scan an original is similar to that shown in FIGS. 4 and 5.

Figure 8:
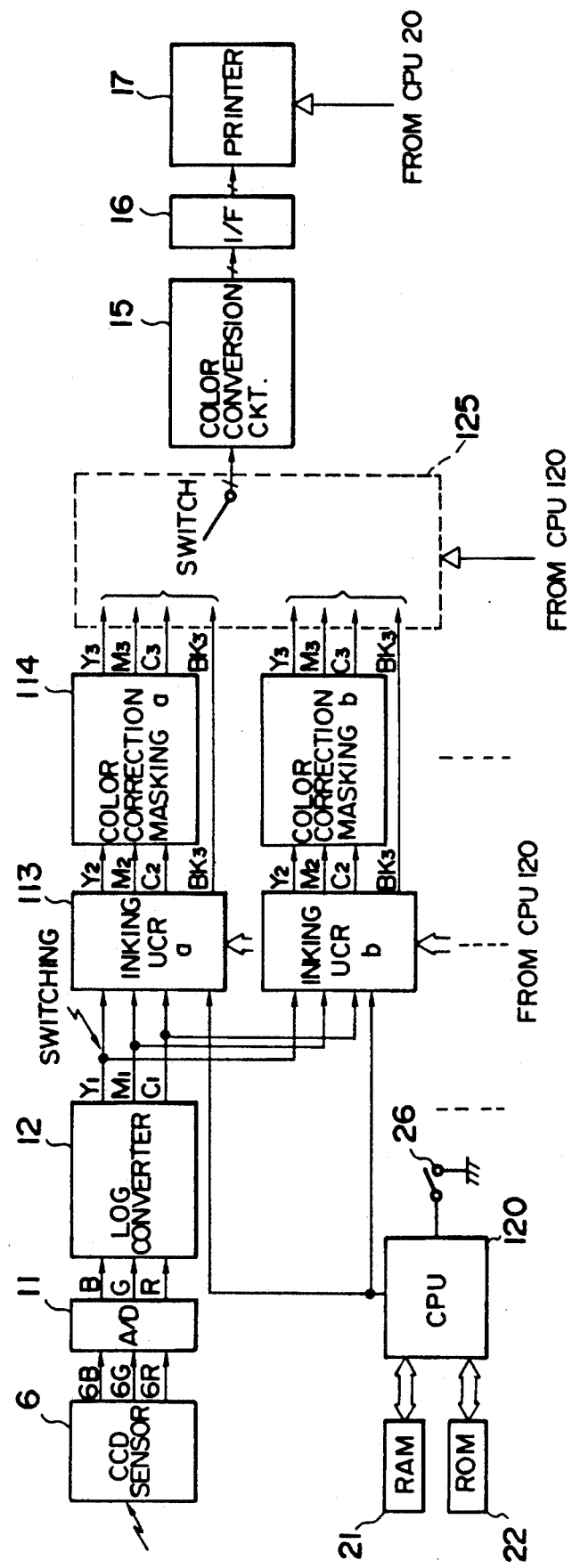
FIG. 8 is a block diagram showing an arrangement of an apparatus of the second embodiment of the present invention.

As the original is scanned, the electric signal from the CCD 6 is processed by a signal processing circuit, shown in FIG. 8.

In FIG. 8, reference numerals 6R, 6G, and 6B indicate the signals from the devices of R, G, and B of the CCD 6. The R, G, and B signals 6R, 6G, and 6B are input to the A/D conversion circuit 11 and LOG conversion circuit 12 and converted into the $Y_1$, $M_1$, and $C_1$ signals in the digital signal format.

The $Y_1$, $M_1$, and $C_1$ signals are input to an image signal producing circuit 113 to perform the undercolor removal (hereinafter, referred to as a UCR) and the inking process and the $Y_2$, $M_2$, $C_2$, and $Bk_3$ signals are produced by the arithmetic operating processes shown by the following equations:

When $(Y_1, M_1, C_1)_{min} - K_4 > 0$, $Y_2 = Y_1 - k_3(Y_1, M_1, C_1)_{min}$ $M_2 = M_1 - k_3(Y_1, M_1, C_1)_{min}$ $C_2 = C_1 - k_3(Y_1, M_1, C_1)_{min}$ $Bk_3 = k_3(Y_1, M_1, C_1)_{min} + k_2$ (i)

When $(Y_1, M_1, C_1)_{min} - k_4 \leq 0$, $Y_2 = Y_1$ $M_2 = M_1$ $C_2 = C_1$ $Bk_3 = k_1(Y_1, M_1, C_1)_{min} + k_2$ (ii)

$(Y_1, M_1, C_1)_{min}$ indicates the minimum signal among the $Y_1$, $M_1$, and $C_1$ signals, $k_1$, $k_2$, $k_3$, and $k_4$ are constants.

As mentioned above, the UCR operation is such that the $(Y_1, M_1, C_1)_{min}$ is calculated and the amounts of color materials of Y, M, and C are reduced. $k_3$ is a coefficient to determine the UCR amount. $k_4$ is a coefficient to decide a point to start the UCR operation.

The inking operation is such that the black toner (or black ink or the like) is added in place of each color material in accordance with the UCR amount. $k_1$ is a coefficient to decide an inking amount to be added. $k_2$ is a coefficient to determine a point to start the inking operation.

The values of $k_1$ and $k_3$ or $k_2$ and $k_4$ are different; however, they can be also set to the same value, respectively.

An explanation will now be made hereinbelow with respect to a method of determining the constants $k_1$ and $k_2$ when the $Y_2$, $M_2$, $C_2$, and $Bk_3$ signals shown in the equations (i) and (ii) are produced, that is, the coefficients for inking.

i denotes each patch on the reference color original (which will be explained hereinbelow) (for instance, i=0 to 63). Y′, M′, and C′ correspond to $Y_1$, $M_1$, and $C_1$ in FIG. 8. $Bk_i$ indicates an ink amount at each point on the color image which is used when $k_1$ and $k_2$ are decided and i represents the number of each point.

$k_1$ and $k_2$ are decided by setting the evaluating function of black to $\phi$:

$$\frac{\delta\phi}{\delta k_1} = 2\left( \sum_i (Y_1, M_1, C_1)_{min} - k_1 + \right.$$

$$\left. \sum_i (Y_1, M_1, C_1)_{min} - k_2 - \sum_i Bk_i(Y_1, M_1, C_1)_{min} \right) = 0$$

$$\frac{\delta\phi}{\delta k_2} = 2\left( \sum_i (Y_1, M_1, C)_{min} - k_1 + \left(\sum_i 1\right)k_2 - \sum_i Bk_i \right) = 0$$

Therefore, $$\begin{bmatrix} \sum_i (Y_1, M_1, C_1)^2_{min} & \sum_i (Y_1, M_1, C_1)_{min} \\ \sum_i (Y_1, M_1, C_1)_{min} & \sum_i 1 \end{bmatrix} \begin{bmatrix} k_1 \\ k_2 \end{bmatrix} =$$

$$\begin{bmatrix} \sum_i (Y_1, M_1, C_1)_{min} \cdot Bk_i \\ \sum_i Bk_i \end{bmatrix}$$

When the above equation is expressed a s $[E][F] = [G]$, the coefficients $k_1$ and $k_2$ are obtained by $F = E^{-1} \cdot G$. $E^{-1}$ is an inverse matrix of E.

The $Y_2$, $M_2$, $C_2$, and $Bk_3$ signals produced by the image signal producing circuit are input to a color correction circuit 114 and subjected to the arithmetic operating processes shown by the following equation, so that $Y_3$, $M_3$, $C_3$, and $Bk_3$ signals are obtained (in this embodiment, no arithmetic operating process is executed with respect to the Bk signal in the color correction circuit 114, so that $Bk_2 = Bk_3$):

$$\begin{bmatrix} Y_3 \\ M_3 \\ C_3 \end{bmatrix} = \begin{bmatrix} a_{11} a_{12} a_{13} \\ a_{21} a_{22} a_{33} \\ a_{31} a_{32} a_{33} \end{bmatrix} \begin{bmatrix} Y_2 \\ M_2 \\ C_2 \end{bmatrix}$$

$a_{11}$ to $a_{33}$ denote masking coefficients for the color correction, respectively. The above processes are controlled by a CPU (central processing unit) 120. Arithmetic operating programs and data are stored in the RAM (random access memory) 21 and ROM (read only memory) 22.

The construction of the printer 17 is the same as that shown in FIG. 1-1.

The embodiment shown in FIG. 8 is constructed such as to also switch the masking coefficients in a manner similar to the case described in the embodiment shown in FIG. 1-1

The operation of the embodiment shown in FIG. 8 will now be explained with reference to FIG. 9.

Figure 9:
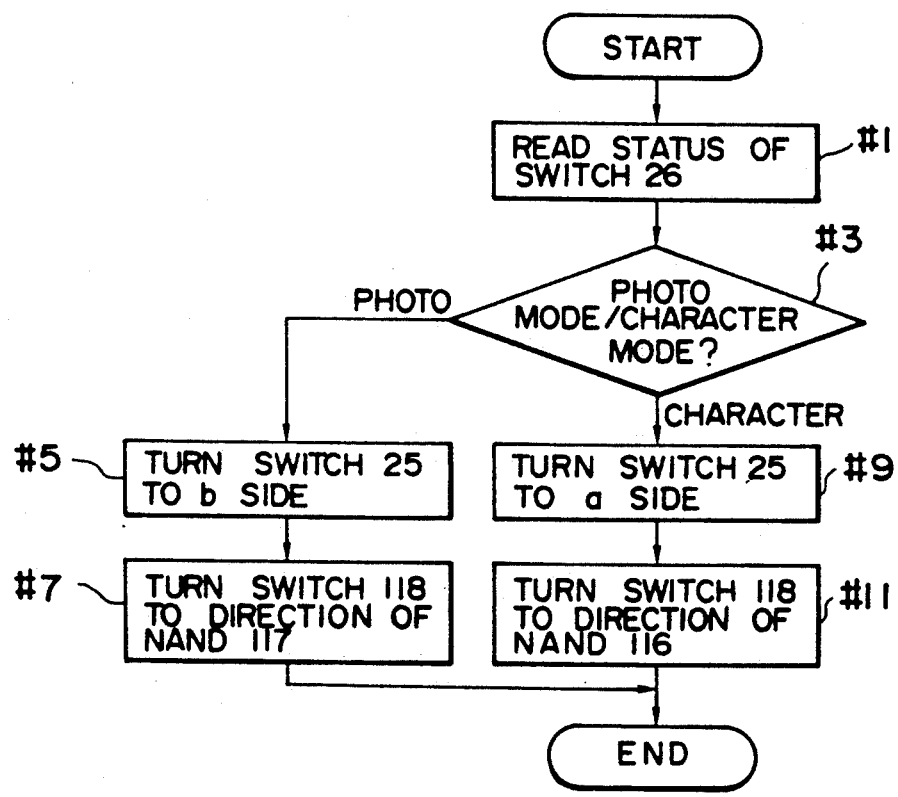
FIG. 9 is a flowchart for explaining the operation of CPU 20 in the embodiment of FIG. 8.

In FIG. 9, the status of the mode setting switch 26 is first read (step #1). A check is made to see if the photo mode or the character mode has been set or not (step #3). The photo mode is a mode corresponding to the reproducing characteristic of the medium gradation shown by b in FIG. 3, which will be explained hereinbelow. The character mode is a mode corresponding to the reproducing characteristic shown by a in FIG. 3, which will be explained hereinbelow. If the photo mode has been set in step #3, a switching circuit 125 is connected to a b side (step #5) and the switch 118 is switched to the side of the NAND gate 117 (step #7). If the character mode has been set in step #3, the switching circuit 125 is connected to an a side (step #9) and the switch 118 is switched to the side of the NAND gate 116 (step #11). Thus, the color correction can be performed by performing the inking operation in accordance with the gradation reproducing characteristics of the printer 17 and by changing the CR operation and masking coefficients.

An explanation will now be made with reference to FIG. 10 with respect to advantages which are obtained by changing the image signal producing circuit 113 in accordance with the gradation reproducing characteristic as shown in this embodiment.

Figure 10:
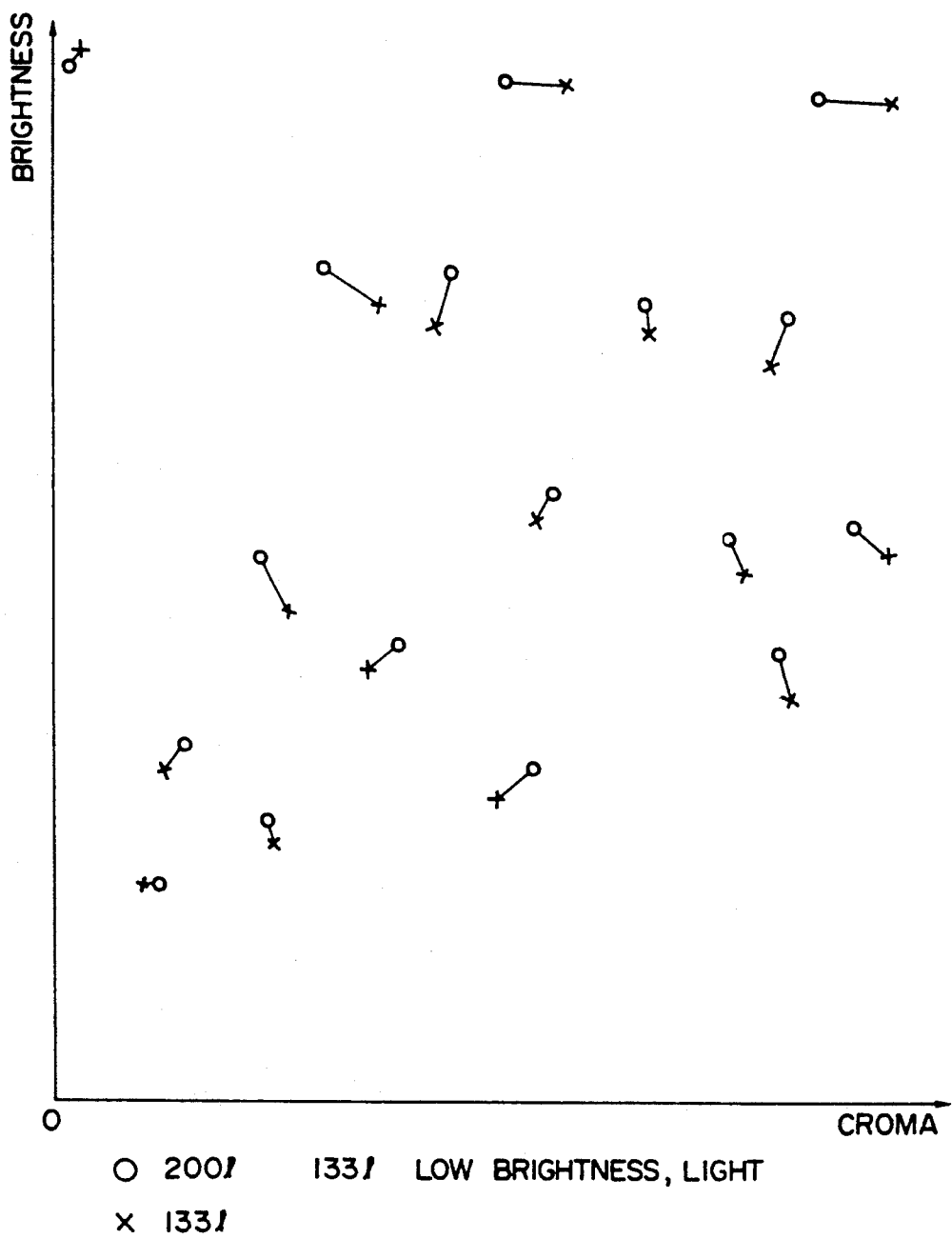
FIG. 10 is a diagram showing the relation between the brightness and the chroma when an image of a reference color original is reproduced.

FIG. 10 is a diagram showing the difference of the color reproducing characteristics by the reference signals a and b. As shown in FIGS. 6-1 and 6-2, the diagrams shown on the a* and b* surfaces are expressed by the coordinates of chroma and brightness (L*).

In FIG. 10, the marks ○ denote the coordinates of the medium gradations output by each single color or mixed colors of yellow, magenta, and cyan by using the reference signal a. The marks x indicate coordinates of the medium gradations output by using the reference signal b. As will be understood from FIG. 8, when an image is output by using the reference signal b, the brightness of the high-light portion is lower than that in the case of using the signal a and there are much reproduction colors of bright colors.

Namely, when using the reference signal b, the number of colors (including also achromatic bue) which can be reproduced by using each single color or mixed colors of yellow, magenta, and cyan in the brightness direction in the high-light portions is larger than that in the case of using the reference signal a. On the contrary, when using the reference signal a, the number of colors which are obtained by the single color or mixed colors is larger in the high density portion than that in the case of using the signal b.

Therefore, the coefficients $k_1$, $k_2$, $k_3$, and $k_4$ to determine the UCR and an inking amount are obtained by using the image which has been output by using the reference signal a as mentioned above (the resultant coefficients are referred to as $k_n(a)$; $n=1, 2, 3, 4$). When an image is output by the reference signal b by using $k_n(a)$, a dark image is obtained as a whole. This is because as shown in FIG. 10, since the number of reproduction colors in the brightness axis direction in the high-light portions in the case of using the reference signal b is large, the UCR operation and the inking operation are executed even for colors which can be color-reproduced without using the Bk signal.

On the contrary, when an image is output by the reference signal a by using the coefficients $k_n(b)$ for the UCR operation and inking operation which were obtained with respect to the reference signal b, the magnitude of Bk signal is small and black cannot be sufficiently reproduced.

As mentioned above, when an image is output by the reference signal a by using the coefficients $k_n(a)$ for the UCR and inking operations, high brightness can be also reproduced. When an image is output by the reference signal b by using the coefficients $k_n(b)$, the vivid color reproduction of the high-light portions can be realized.

As mentioned above, in the case of an original mainly consisting of characters, an image is formed by using both of the reference signal a and the color image signal which was converted and produced by the masking coefficients (a) and the UCR and inking coefficients $k_n(a)$. In the case of an original mainly consisting of a photograph, an image is formed by using both of the reference signal b and the color image signal which was converted and produced by the masking coefficients (b) and the UCR and inking coefficients $k_n(b)$. Thus, a picture quality which reflects an original at a high fidelity can be always obtained. In the coefficients $k_n(a)$ and $k_n(b)$, n can be set to an arbitrary value. Either the UCR, or the inking, or both the UCR and inking can be executed.

For the selection of the combination of the masking coefficients, the UCR coefficients and/or inking coefficients, and/or the reference signal mentioned above, for instance, it is sufficient to switch the character mode and photo, mode by the operating section. Or, the type of an original is automatically recognized by the color image reading means and the reference signal is switched. The masking coefficients and the UCR and inking coefficients can be also switched due to the switching of the reference signal.

Other embodiments

Although the foregoing embodiment has been described with respect to a color image forming apparatus using the pulse width modulation, other embodiments will now be described.

It will be obvious that even in a color image forming apparatus of the type in which a light emitting amount of the laser is changed and the gradation reproduction is executed by the dot area modulation, when the number of lines is switched, similar problems occur with respect to the gradation reproduction, color reproduction, and the like.

When the invention is applied to such an apparatus, the masking coefficients and/or the UCR coefficients and inking coefficients of the image reading means are respectively prepared and switched in correspondence to the switching of the number of lines of the image forming means, so that the picture quality can be reproduced with high fidelity.

On the other hand, when a dither pattern is changed, the gradation reproduction, color reproduction, and the like also change even in a color image forming apparatus by a density modulating method whereby specific pixels are formed by a predetermined laser spot or ink jet and the lighting on/off operation of each pixel is selected, for instance, by a dither pattern method which has conventionally been well-known. Therefore, by applying the present invention, the masking coefficients and/or the UCR coefficients and/or the inking coefficients of the image reading means are respectively prepared and switched in correspondence to the dither pattern, so that the picture quality can be reproduced with high fidelity.

In the embodiment described above, the image signal producing circuit 113 shown in FIG. 8 has been used as the processing means for performing the undercolor removing process of the color image signal supplied.

The undercolor removing operation has been performed by subtracting $k_3(Y_1, M_1, C_1)_{min}$ from the signal of each color. The inking operation has been executed by using $k_1(Y_1, M_1, C_1)$ as the Bk signal. However, the present invention does not always require both of those operations and only one of them (either one) may be executed. On, the other hand, those operations can be also performed electrically or optically.

The color laser printer for forming an image according to the signal obtained by performing the pulse width modulation or the color thermal transfer printer or color ink jet printer which can change the gradation reproducing characteristic has been used as the color image processing means which has a predetermined gradation reproducing characteristic and processes a color image in accordance with the signal whose undercolor removal process was performed by the foregoing processing means. However, it is also possible to use an apparatus in which an image is not necessarily formed but an image signal is merely electrically processed and the resultant electric signal is output to an outer printer.

In the foregoing embodiments, the color laser printer, color thermal transfer printer, or color ink jet printer has been used as the color image forming means which can change image forming condition. However, the invention is not limited to such printers. For instance, in short, it is also possible to use means which can change the image forming condition such that the dither matrix is changed or the latent image forming condition or developing condition is changed.

The CPU 120 to switch the switching circuit 125 shown in FIG. 8 in accordance with the switching of the state of the switch 118 shown in FIG. 2 has been used as the means for controlling the processing state of the undercolor removal processing means in accordance with the gradation reproducing characteristic of the color image processing means.

Further, in connection with the next embodiment, an explanation will now be made with respect to an apparatus which can change the color correcting characteristic every region in, for instance, one original in the same image.

Figure 11:
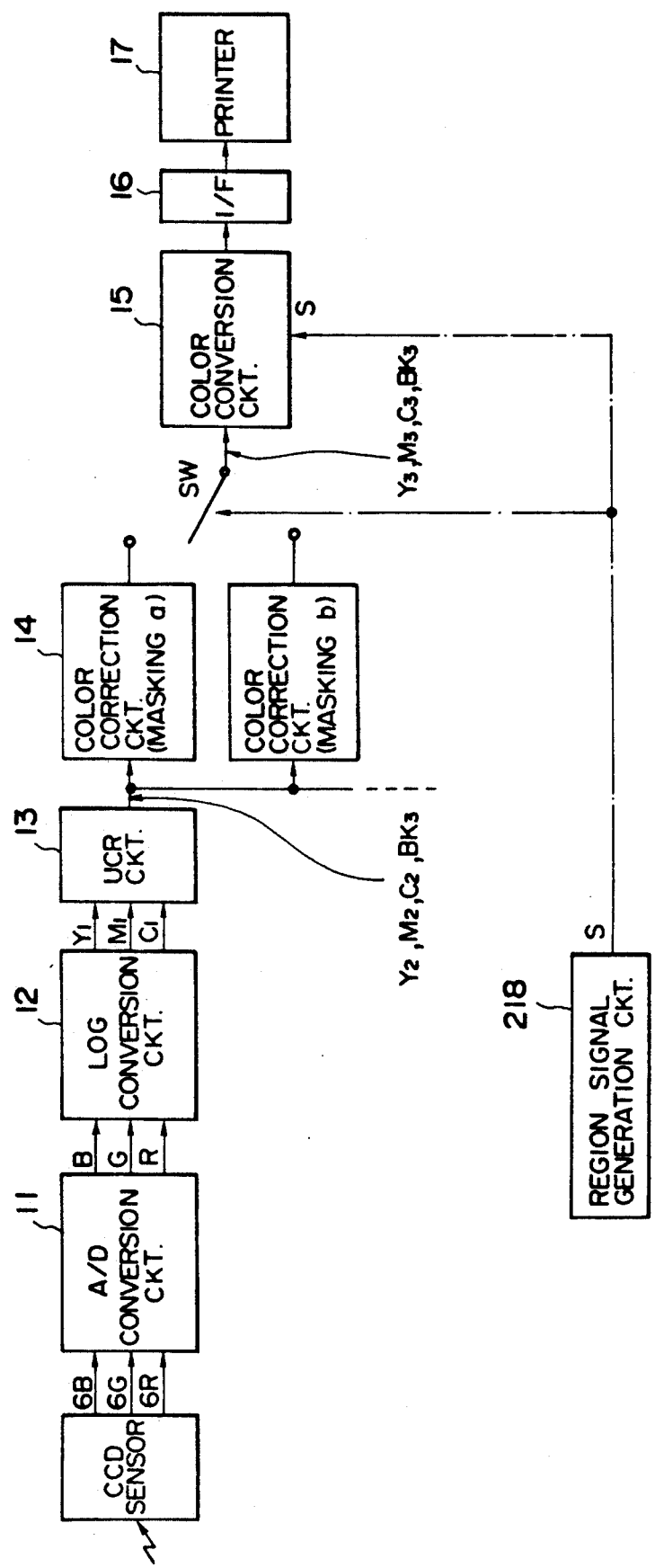
FIGS. 11 and 12 are block diagrams showing constructions of apparatuses in the third and fourth embodiments of the invention, respectively.

FIG. 11 is a block diagram showing a construction of such an embodiment. As shown in FIG. 11, in the embodiment, a region signal generation circuit 218 is provided. The color correcting characteristic can be changed in, for instance, one original in response to an output from the generation circuit 218. The other sections are similar to those in the embodiment shown in FIG. 1.

Therefore, on the basis of the signal from the generation circuit 218, in the character image region, an image is formed by the reference signal a by using the color image signal converted by the masking coefficients (a), and in the photograph image region, an image is formed by the reference signal b by using the color image signal converted by the masking coefficients (b). Thus, the good picture quality according to the nature of the original can be obtained with high fidelity. The processes of a switch SW and the color conversion circuit 15 are selected in the foregoing combination by a selection signal S.

In connection with the next embodiment, an explanation will now be made with respect to an apparatus which can change not only the color correcting characteristic but also the undercolor removal processing characteristic for every region even in, for instance, one original in the same image, in the embodiment shown in FIG. 11.

Figure 12:
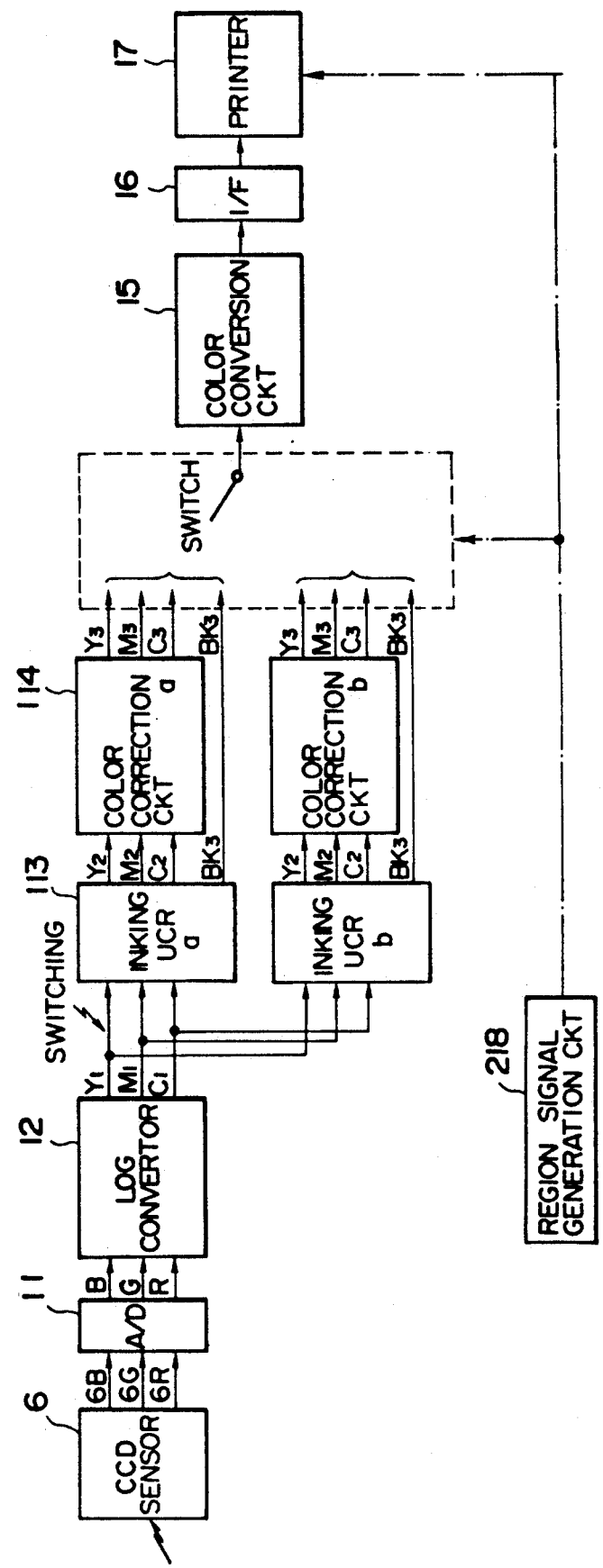

FIG. 12 is a block diagram showing a construction of such an embodiment. As shown in FIG. 12, in this embodiment, two systems of the image signal producing circuit 113 to perform the undercolor removal (hereinafter, referred to as UCR) process and the inking process and the color correction circuit 114 are switched between by the output of the region signal generation circuit 218. Similarly to the embodiment shown in FIG. 11, the other portions are similar to those in the embodiment shown in FIG. 1. As described above, in this embodiment, an image is formed by using both the output of the reference signal 112a and the color image signal converted by the UCR and inking coefficients $k_n$ (a) in the character image region on the basis of the signal from the region signal generation circuit 218. On the other hand, in the photograph image region, an image is formed by using both of a reference signal 112b and the color image signal converted by the UCR and inking coefficients $k_n$(b) and masking coefficients (b). Thus, good picture quality according to the original can be obtained with high fidelity For the switching of the character image region and the photograph image region in the image data, it is sufficient to designate the region on a pixel unit basis by the digitizer and to set the inside of the region to the photo mode and to set the outside of the region to the character mode or the like in this embodiment. The reference signal is selected and the UCR and inking coefficients and masking coefficients are selected in accordance with such setting operations.

In the embodiments of FIGS. 11 and 12, the signal from the region signal generation circuit 218 is a region signal which indicates the character image (diagram) region signal and photograph image region signal by the coordinates in the main scanning direction from the digitizer which will be explained hereinlater. In this embodiment, the digitizer (not shown) is provided as the means for designating the region, of the original image. The coordinate positions in the main scanning direction and sub-scanning direction are designated by the digitizer. The coordinate information is input to a CPU (central processing unit) (not shown). The region signal corresponding to the region indicated from the region signal generation circuit 218 is input to the signal processing circuit.

The construction of the printer 17 shown in FIG. 1 and the like will now be described.

Figure 13:
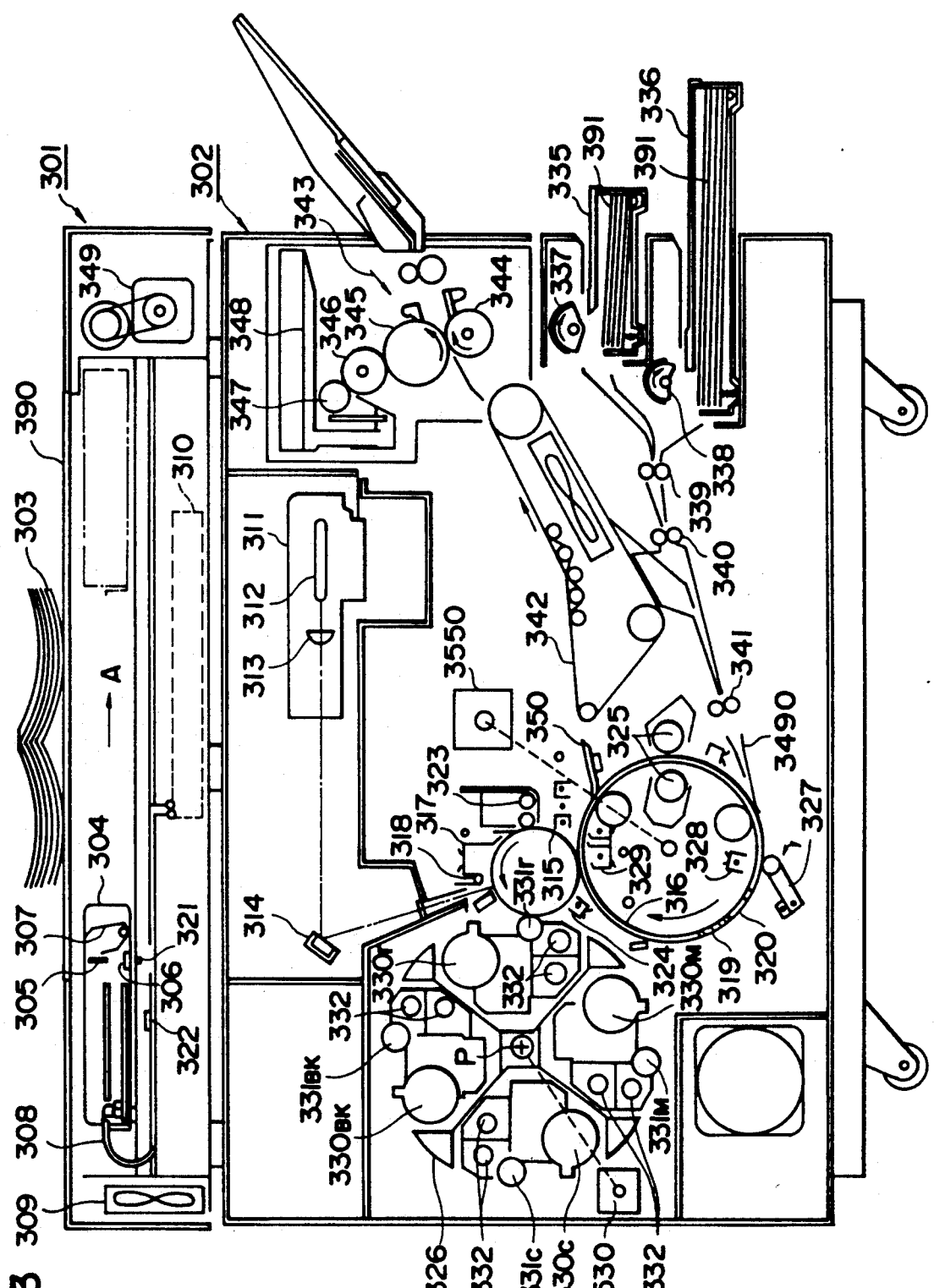
FIG. 13 is a block diagram for explaining a construction of printer 17.

FIG. 13 shows an example of a schematic internal construction of a digital color image processing system according to the present invention. As shown in the diagram, the system has a digital color image reading apparatus (hereinafter, referred to as a color reader) 301 in the upper portion and the digital color image printing apparatus (hereinafter, referred to as the color printer) 17 in the lower portion. In the color reader 301, the color image information of an original is read for every color and is converted into electric digital image signals, by color separating means and photoelectric converting, devices such as CCDs, which will be explained hereinbelow. On the other hand, a color printer 302 is a laser beam color printer of the electrophotographic type in which a color image is reproduced for every color in accordance with the digital image signal and transferred onto a recording paper a plurality of times in a digital dot format and recorded thereon.

(Reader)

A construction of the color reader 301 will now be schematically described. Reference numeral 303 denotes an original and 304 indicates an original scanning unit to scan the original 303. The original scanning unit 304 has therein a rod array lens 305, an equal magnification type color separating line sensor (CCD) 306, and an exposing lamp 307. Reference numeral 308 denotes a wiring cord of the original scanning unit 304, 309 is a fan for cooling, and 310 is an image processing unit connected to the original scanning unit 304 through the wiring cord 308.

When the scanning unit 304 moves and scans in the direction of arrow A in the diagram by means of a scanner driving motor 349 to read an image of the original 303 put on the original base plate, the exposing lamp 307 in the scanning unit 304 is simultaneously lit. The reflected light from the original 303 is transmitted through the rod array lens 305 and converged to the line sensor 306 as a reading sensor of the color information.

On the other hand, reference numeral 321 denotes an actuator attached under the scanning unit 304 and 322 indicates a home position sensor consisting of a photointerrupter or the like to detect the home scanning position of the scanning unit 304 through the actuator 321.

(Printer)

A construction of the color printer 17 will now be schematically explained. Reference numeral 311 denotes a scanner comprising: a laser output section (refer to FIG. 5) to convert the image signal from the color reader 301 into the photo signal; a polygon mirror 312 of a polyhedral shape (e.g., octahedron); a motor (not shown) to rotate the mirror 312; an f/θ lens (image forming lens) 313; and the like. Reference numeral 314 denotes a reflective mirror to change the optical path of a laser beam and 315 indicates a photosensitive drum. The laser beam emitted from the laser output section is reflected by the polygon mirror 312 and is transmitted through the lens 313 and mirror 314 and scans the surface of the drum 315 in a line manner (raster scan), thereby forming a latent image corresponding to the original image.

On the other hand, reference numeral 317 denotes a primary charging device; 318 represents a whole surface exposing lamp; 323 a cleaner section to collect the residual toner which was not transferred; and 324 a pre-transfer charging device. These components are arranged around the drum 315.

Reference numeral 326 denotes a developing unit to develop the electrostatic latent image formed on the surface of the photosensitive drum 315 by the exposure by a laser. Reference numerals 331Y, 331M, 331C, and 331BK denote developing sleeves which are come into contact with the photosensitive drum 315 and directly perform the development, 330Y, 330M, 330C, and 330BK indicate toner hoppers to hold spare toners, and 332 a screw to feed the developing agents. The developing unit 326 is constructed of the sleeves 331Y to 331BK, toner hoppers 330Y to 330BK, and screw 332. These components are arranged around a rotating shaft P of the developing unit. For instance, when a toner image of yellow is formed, the yellow toner development is performed at the position shown in the diagram. When forming a toner image of magenta, the developing unit 326 is rotated around the shaft P in the diagram as a rotational center and the developing sleeve 331M in the developing device of magenta is arranged at the position which has come into contact with the photosensitive drum 315. Similar operations are also executed with respect to the development of cyan and black. The developing unit is rotated and moved by a motor 3530.

Reference numeral 316 denotes a transfer drum to transfer the toner images formed on the drum 315 onto a paper; 319 indicates an actuator plate to detect the movement position of the transfer drum 316; 320 is a home Position sensor which approaches the actuator plate 319, thereby detecting when the transfer drum 316 has been moved to the home position; 325 a transfer drum cleaner; 327 a paper pressing roller; 328 a discharging device; and 329 a transfer charging device. The components 319, 320, 325, 327, and 329 are arranged around the transfer drum 316.

On the other hand, reference numerals 335 and 336 denote paper feed cassettes to enclose papers (sheets); 337 and 338 are paper feed rollers to feed the papers one by one from the cassettes 335 and 336; and 339, 340, and 341 are timing rollers for setting the timings for feeding and conveying the papers. The paper fed and conveyed through those components is led to a paper guide 3490 and wound around the transfer drum 316 while its front edge is gripped by a gripper (refer to 51 in FIG. 6), which will be explained hereinbelow. Then, the paper is subjected to the image forming process.

Reference numeral 3530 denotes the drum rotating motor to synchronously rotate the photo sensitive drum 315 and transfer drum 316; 350 indicates a peeling-off nail to remove the paper from the transfer drum 316 after completion of the image forming process; 342 a conveying belt to convey the removed paper; and 343 an image fixing section to fix the paper conveyed by the conveying belt 342. The image fixing section 343 has a pair of thermal pressure rollers 344 and 345.

Figure 14:
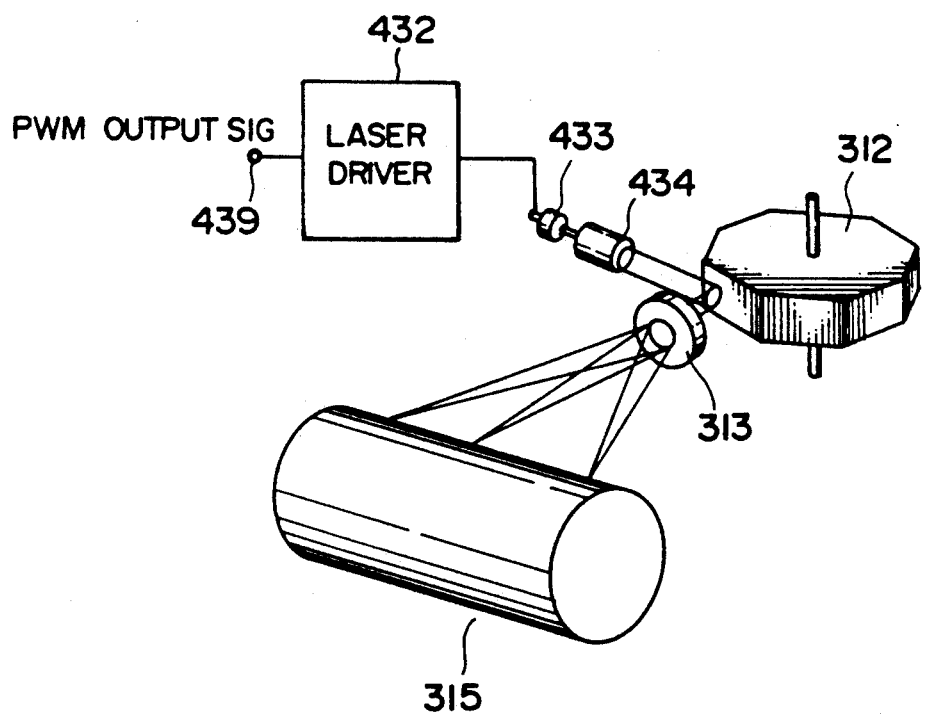
FIG. 14 is an enlarged diagram of the main section in FIG. 13.

FIG. 14 is an enlarged diagram of the main section in the Printer shown in FIG. 13. The PWM output modulated by the circuit shown in FIG. 2, that is, an output 439 of the switch 118 modulates a laser driver 432 and a semiconductor laser 433 is pulse width modulated and a laser beam is emitted therefrom. The laser beam emitted from the semiconductor laser 433 is collimated by a collimating lens 434 and deflected by the rotating polygon mirror 312 and scans the photosensitive drum 315 through the f/θ lens 313. The light image formed on the photosensitive drum produces an electrostatic latent image and the image is output by the processes in an ordinary copying machine.

The reflective mirror 314 is omitted in FIG. 14.

FIG. 15 is an external view of a digitizer 16. Reference numerals 422 to 427 denote entry keys to set, for instance, various modes of image processing. Particularly, the key 424 is the area designating switch to designate an area to generate a region signal from the region signal generation circuit 218. The switch 426 is provided to designate a character region. The switch 427 is used to designate a medium gradation region.

A coordinate detection plate 420 is a coordinate position detecting plate to designate an arbitrary region on an original or to set a magnification. A point pen 421 is used to designate the coordinates. The key and coordinate input information are transmitted from and received to the region signal generation circuit 218 through the bus and stored into an RAM in the generation circuit 218.

According to the embodiments mentioned above, the color image forming apparatus using the PWM modulation has been described Further other embodiments will now be described hereinbelow.

Embodiment A

It is obvious that similar problems occur with respect to the gradation reproduction, color reproduction, and the like when the number of lines is switched for every area by the area designation in the color image forming apparatus of the type in which the light emission of the laser is changed and the gradation reproduction is performed by dot area modulation. Therefore, according to the invention, good picture quality can be reproduced at a high fidelity by switching the number of lines by the area designation of the image forming means and by respectively preparing and switching the masking coefficients of the image processing means.

Embodiment B

Even in the color image forming apparatus by the conventionally well-known dither pattern method whereby specific pixels are formed by a predetermined laser spot or ink jet and the lighting on/off operation of each pixel is selected, when the dither pattern is changed for every area by the area designation, the gradation reproduction, color reproduction, and the like also change. Therefore, according to the invention, good picture quality can be reproduced with high fidelity by respectively preparing and switching the dither patterns and the masking coefficients of the image processing means in accordance with the mode for every area.

A color thermal transfer printer a color ink jet printer, or the like may be also used as the printer 17.

As described above, according to the embodiment shown in FIG. 11, since the combination of the masking coefficients and gradation reproducing means can be selected for every area, even in the case where characters and photographs mixedly exist in one picture plane, good picture quality can be always reproduced with high fidelity for an original.

According to the embodiment shown in FIG. 12, the image according to an original can be reproduced with high fidelity by switching the number of lines of the image forming unit by the area designation of the color image processing section and by respectively preparing and switching and using the UCR processes and inking coefficients corresponding to the number of lines switched. On the other hand, the invention can be also applied to an apparatus in which an image is formed by a laser spot or an ink jet or the like and the image processes are executed by the dither pattern. In this case, good picture quality according to an original can be reproduced with high fidelity by preparing and switching the UCR and inking coefficients and the masking coefficients in correspondence to the dither pattern according to each mode for every area.

As described above, according to the foregoing embodiments, by respectively preparing the UCR and masking coefficients corresponding to the reference signals of the laser drive signal every designated area of the image data, even when characters and photographs mixedly exist in one picture plane, good picture quality can be always reproduced with high fidelity for an original.

As described above, according to the preferred embodiments, there is the advantage that a color image suitable for an original image can be reproduced.

What is claimed is:

1. A color image processing apparatus comprising:
    a) color processing means for color processing a color image signal;
    b) first means which has a predetermined gradation reproducing characteristic and processes a color image in accordance with the signal which has been color processed by said color processing means, wherein said first means can switch the resolution of the gradation processing; and
    c) control means for controlling a color correction coefficient that is used by said color processing means, in accordance with the resolution switching by said first means.

2. An apparatus according to claim 1, wherein said color processing means is color masking processing means.

3. An apparatus according to claim 1, wherein said color processing means is undercolor processing means.

4. An apparatus according to claim 3, wherein said undercolor processing means includes means for detecting the minimum value of each of primary color signals of the color image signal and is means for removing a value which is obtained by multiplying a predetermined coefficient to said minimum value as an undercolor from each of the primary color signal.

5. An apparatus according to claim 4, wherein said first means is means for forming a color image in accordance with the signal from which the undercolor was removed.

6. An apparatus according to claim 1, wherein said first means is means which can change the gradation reproducing characteristic.

7. An apparatus according to claim 6, wherein said first means is means for forming a color image in accordance with the color processed signal.

8. An apparatus according to claim 7, wherein said color image forming means is means for reproducing a color image by an electrophotographic system.

9. An apparatus according to claim 7, wherein said color image forming means includes modulating means for pulse width modulating the color image signal which was color processed by said color processing means, and said color image forming condition can be changed by changing a reference frequency of said modulating means.

10. A color image forming apparatus comprising:
    a) means for color processing a color image signal;
    b) means for forming a color image in accordance with the color image signal which has been color processed by said color processing means, said color image forming means being able to change a resolution of a color image formed by said forming means; and
    c) control means for controlling a color correction coefficient that is used by said color processing means in accordance with the resolution change by said image forming means.

11. An apparatus according to claim 10, wherein said color processing means is color masking processing means.

12. An apparatus according to claim 10, wherein said color processing means is undercolor processing means.

13. An apparatus according to claim 10, wherein said color image forming means includes modulating means for pulse width modulating the color image signal which was color processed by said color processing means, and said color image forming condition can be changed by changing a reference frequency of said modulating means.

14. An apparatus according to claim 12, wherein said undercolor processing means includes means for detecting the minimum value of each of primary color signals of the color image signal and is means for removing a value which is obtained by multiplying a predetermined coefficient to said minimum value as an undercolor from each of the primary color signal.

15. An apparatus according to claim 10, wherein said color image forming means is means for reproducing a color image by an electrophotographic system.

16. A color image processing apparatus comprising:
a) gradation reproducing means having different gradation reproducing characteristics;
b) color processing means for color processing a given image in accordance with the gradation reproducing characteristic of said gradation reproducing means; and
c) control means for controlling a color correction coefficient that is used by said color processing means and gradation characteristics of said gradation reproducing means in accordance with an image region,
wherein said gradation reproducing means includes means for pulse width modulating an image signal which was color processed by said color processing means and has different gradation reproducing characteristics by providing a plurality of reference frequencies for said modulating means.

17. An apparatus according to claim 16, wherein said color processing means is color masking processing means.

18. An apparatus according to claim 17, wherein said undercolor processing means includes means for detecting the minimum value of each of primary color signals of the color image signal and is means for removing a value which is obtained by multiplying a predetermined coefficient to said minimum value as an undercolor from each of the primary color signal.

19. An apparatus according to claim 18, wherein said gradation reproducing means is means for forming a color image in accordance with the signal whose undercolor was removed.

20. An apparatus according to claim 16, wherein said color processing means is undercolor processing means.

21. An apparatus according to claim 16, wherein said gradation reproducing means is means for reproducing the image which was color processed by said color processing means.

22. An apparatus according to claim 16, wherein said graduation reproducing means is means for reproducing a color image by an electrophotographic system.

23. An apparatus according to claim 16, further comprising:
means for generating a region designation signal to designate said image region.

24. An apparatus according to claim 23, wherein said generating means includes a digitizer.

25. A color image processing apparatus for color correcting a given color image signal, comprising:
a) color processing means for color processing a color image signal;
b) modulating means for comparing a plurality of reference signals of different frequencies with the color image signal and for modulating each of plural color component signals of the color image signal which was color processed by said color processing means;
c) selecting means for selecting an output of said modulating means in correspondence to a designated region of an image represented by the color image signal; and
d) control means for controlling a color correction coefficient that is used by said color processing means in accordance with the output selected by said selecting means.

26. An apparatus according to claim 25, further comprising:
e) generating means for generating a signal to designate said region.

27. An apparatus according to claim 26, wherein said generating means includes a digitizer.

28. An apparatus according to claim 25, wherein said color processing means is color masking processing means.

29. An apparatus according to claim 25, wherein said color Processing means is undercolor processing means.

30. An apparatus according to claim 25, further comprising:
supplying means for supplying the signal modulated by said modulating means to color image forming means.

31. An apparatus according to claim 30, wherein said color image forming means is means for reproducing a color image by an electrophotographic system.

* * * * *

UNITED STATES PATENT AND TRADEMARK OFFICE
CERTIFICATE OF CORRECTION

PATENT NO. : 5,245,419
DATED : September 14, 1993
INVENTOR(S) : SONO GU

It is certified that error appears in the above-identified patent and that said Letters Patent is hereby corrected as shown below:

ON TITLE PAGE

In [56] References Cited:
  Under U.S. PATENT DOCUMENTS, insert:
    --4,631,578  12/1986  Sasaki et al. .... 358/80
      4,674,861   6/1987  Kawamura ........ 355/4--.

Insert:   -- FOREIGN PATENT DOCUMENTS
           225100  6/1987  European Pat. Off. --.

COLUMN 2

Line 6, "process" should read --processing--.

COLUMN 3

Line 25, "this" should read --the-- and
        "the" should read --this--.
Line 28, "direction in" should read --direction of--.
Line 29, "FIG. 4 arrow of the" should read
        --the arrow in FIG. 4,--.
Line 43, "equations;" should read --equations:--.
Line 58, "equation;" should read --equation:--.
Line 63, "$a_{21}a_{22}a_{33}$" should read --$a_{21}a_{22}a_{23}$--.

COLUMN 4

Line 34, "periods" should read --periods,--.

UNITED STATES PATENT AND TRADEMARK OFFICE
CERTIFICATE OF CORRECTION

PATENT NO. : 5,245,419
DATED : September 14, 1993
INVENTOR(S) : SONO GU

It is certified that error appears in the above-identified patent and that said Letters Patent is hereby corrected as shown below:

COLUMN 5

Line 11, "equal" should read --equal,--.
Line 20, "square" should read --squares--.
Line 29, "hereinlater." should read --hereinbelow.--.
Line 32, "obtained;" should read --obtained:--.
Line 60, "obtained;" should read --obtained:--.
Line 66, "$a_{15}$" should read --$a_{13}$--.

COLUMN 6

Line 50, "Yellow)" should read --yellow)--.

COLUMN 7

Line 64, "the" (third occurrence) should be deleted.

COLUMN 9

Line 29, "$(Y_1, M_1, C_1)_{min}-K_4>0,$" should read --$(Y_1, M_1, C_1)_{min}-k_4>0,$--.
Line 49, "signals," should read --signals;--.

COLUMN 10

Line 20, "$\Sigma_i$ 1" should read --$\Sigma$ 1--.
Line 35, "a s" should read --as--.
Line 37, "$E^{-1}$ is" should read --$E^{-1}$. is--.
Line 49, "$a_{21}a_{22}a_{33}$" should read --$a_{21}a_{22}a_{23}$--.
Line 62, ":he" should read --the--.

UNITED STATES PATENT AND TRADEMARK OFFICE
CERTIFICATE OF CORRECTION

PATENT NO. : 5,245,419
DATED : September 14, 1993
INVENTOR(S) : SONO GU

It is certified that error appears in the above-identified patent and that said Letters Patent is hereby corrected as shown below:

COLUMN 11

Line 37, "much" should be deleted.
    Line 40, "bue)" should read --hue)--.

COLUMN 12

Line 26, "photo," should read --photo--.

COLUMN 13

Line 7, "On," should read --On--.

COLUMN 14

Line 38, "digitizer" should read --digitizer,-- and "hereinlater." should read --hereinbelow.--.
    Line 40, "region," should read --region--.
    Line 61, "verting," should read --verting--.

COLUMN 16

Line 8, "Position" should read --position--.
    Line 23, "(refer to 51 in FIG. 6)" should be deleted.
    Line 27, "photo sensitive" should read --photosensitive--.
    Line 36, "Printer" should read --printer--.
    Line 67, "described Further" should read --described. Further--.

COLUMN 17

Line 30, "printer a" should read --printer, a--.

UNITED STATES PATENT AND TRADEMARK OFFICE
CERTIFICATE OF CORRECTION

PATENT NO. : 5,245,419
DATED : September 14, 1993
INVENTOR(S) : SONO GU

It is certified that error appears in the above-identified patent and that said Letters Patent is hereby corrected as shown below:

COLUMN 18

Line 24, "signal." should read --signals.--.

COLUMN 19

Line 7, "signal." should read --signals.--.
    Line 40, "signal." should read --signals.--.

COLUMN 20

Line 4, "graduation" should read --gradation--.
    Line 40, "Processing" should read --processing--.
    Line 43, "supplying means" should read
        --f) supplying means--.

Signed and Sealed this

Ninth Day of August, 1994

Attest:

*Attesting Officer*

BRUCE LEHMAN

*Commissioner of Patents and Trademarks*